US012587008B2

(12) United States Patent
Tsuchiya et al.

(10) Patent No.: US 12,587,008 B2
(45) Date of Patent: Mar. 24, 2026

(54) CUTOFF CONTROL APPARATUS HAVING A FIRST CUTOFF UNIT AND A SECOND CUTOFF UNIT

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Junji Tsuchiya, Osaka (JP); Takafumi Kawakami, Osaka (JP); Seiji Takahashi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 129 days.

(21) Appl. No.: 18/264,611

(22) PCT Filed: Jun. 9, 2021

(86) PCT No.: PCT/JP2021/021893
§ 371 (c)(1),
(2) Date: Aug. 8, 2023

(87) PCT Pub. No.: WO2022/190401
PCT Pub. Date: Sep. 15, 2022

(65) Prior Publication Data
US 2024/0120733 A1 Apr. 11, 2024

(30) Foreign Application Priority Data
Mar. 10, 2021 (JP) ................................. 2021-037884

(51) Int. Cl.
*H02H 7/22* (2006.01)
*B60R 16/03* (2006.01)
*H02H 1/00* (2006.01)

(52) U.S. Cl.
CPC ............... *H02H 7/22* (2013.01); *B60R 16/03* (2013.01); *H02H 1/0007* (2013.01)

(58) Field of Classification Search
CPC .. B60L 15/06; B60L 15/08; B60L 3/04; B60L 50/60; B60L 58/10; B60R 16/02;
(Continued)

(56) References Cited

U.S. PATENT DOCUMENTS 5,703,746 A * 12/1997 Onizuka ............. B60R 16/0238
361/45
6,376,928 B1 * 4/2002 Saka ................... B60R 16/0238
307/10.1
(Continued)

FOREIGN PATENT DOCUMENTS

| EP | 3878697 A1 | | 9/2021 |
|---|---|---|---|
| JP | 58164457 A | * | 9/1983 |
| JP | 2005-005243 A | | 1/2005 |
| JP | 2011223655 A | * | 11/2011 |
| WO | 2020-026859 A1 | | 2/2020 |
| WO | WO-2023095535 A1 | * | 6/2023 |

OTHER PUBLICATIONS

International Search Report, Application No. PCT/JP2021/021893, mailed Aug. 10, 2021. ISA/Japan Patent Office.

*Primary Examiner* — Danny Nguyen
*Assistant Examiner* — Nicolas Bellido
(74) *Attorney, Agent, or Firm* — Honigman LLP

(57) ABSTRACT
A cutoff control apparatus controls a cutoff unit in a vehicle-mounted system which includes: a power storage unit; a power line between the power storage unit and a load; and the cutoff unit that switches between a cutoff state that cuts off supplying of power on the power line from the power storage unit side to the load side and a canceled state where the cutoff state is canceled. In the vehicle-mounted system, the cutoff unit includes a first cutoff unit and a second cutoff unit, and the second cutoff unit enters the cutoff state when
(Continued)

a first overcurrent state has occurred on the power line with the first cutoff unit in the canceled state. The cutoff control apparatus includes a control apparatus that instructs the first cutoff unit to switch to the cutoff state when the power line is in a second overcurrent state.

12 Claims, 10 Drawing Sheets

(58) Field of Classification Search
CPC ...... B60R 16/03; H02H 1/0007; H02H 3/087; H02H 3/093; H02H 3/0935; H02H 3/445; H02H 7/18; H02H 7/22; Y02T 10/64
See application file for complete search history.

(56) References Cited

U.S. PATENT DOCUMENTS

| | | | |
|---|---|---|---|
| 9,221,343 B2 | 12/2015 | Tokarz et al. | |
| 12,194,866 B2 * | 1/2025 | Hirobe | H02H 3/0935 |
| 2012/0170164 A1 * | 7/2012 | Shimizu | H02H 1/0084 |
| | | | 361/63 |
| 2016/0339946 A1 | 11/2016 | Kuramitsu et al. | |
| 2017/0080883 A1 * | 3/2017 | Yasunori | H02J 7/007182 |
| 2018/0093569 A1 | 4/2018 | Takao et al. | |
| 2020/0231042 A1 * | 7/2020 | Morimoto | H02J 7/0031 |
| 2022/0250481 A1 * | 8/2022 | Hirobe | H02H 3/0935 |
| 2024/0246420 A1 * | 7/2024 | Iwaki | H02H 3/087 |

* cited by examiner

CUTOFF CONTROL APPARATUS HAVING A FIRST CUTOFF UNIT AND A SECOND CUTOFF UNIT

CROSS-REFERENCE TO RELATED APPLICATIONS

This application is the U.S. national stage of PCT/JP2021/021893 filed on Jun. 9, 2021, which claims priority of Japanese Patent Application No. JP 2021-037884 filed on Mar. 10, 2021, the contents of which are incorporated herein.

TECHNICAL FIELD

The present disclosure relates to a cutoff control apparatus.

BACKGROUND

U.S. Pat. No. 9,221,343 discloses a technology where a control system, which is interposed on a power line between a high-voltage battery and a plurality of loads, splits the power line into the high-voltage battery-side and the plurality of loads-side when a collision of a vehicle has been detected.

The technology disclosed in U.S. Pat. No. 9,221,343 is an inadequate solution that does not consider the plurality of overcurrent states that can occur for the current flowing on the power line, and is not capable of appropriate control in keeping with the respective overcurrent states.

The present disclosure was conceived in view of the situation described above, and has an object of providing a cutoff control apparatus that considers a plurality of overcurrent states and can perform appropriate control for each overcurrent state.

SUMMARY

A cutoff control apparatus according to the present disclosure is a cutoff control apparatus for controlling a cutoff unit in a vehicle-mounted system, the vehicle-mounted system including: a power storage unit; a power line, which is a line through which power is transferred between the power storage unit and a load; and the cutoff unit that switches between a cutoff state that cuts off supplying of power from the power storage unit side to the load side on the power line and a canceled state where the cutoff state is canceled, wherein in the vehicle-mounted system, the cutoff unit includes a first cutoff unit and a second cutoff unit, and the second cutoff unit enters the cutoff state when a first overcurrent state has occurred on the power line when the first cutoff unit is in the canceled state, and the cutoff control apparatus includes a control apparatus for instructing the first cutoff unit to switch to the cutoff state when the power line is in a second overcurrent state.

Advantageous Effects

According to the present disclosure it is possible to consider a plurality of overcurrent states and perform appropriate control for each overcurrent state.

DETAILED DESCRIPTION OF PREFERRED EMBODIMENTS

Figure 1:
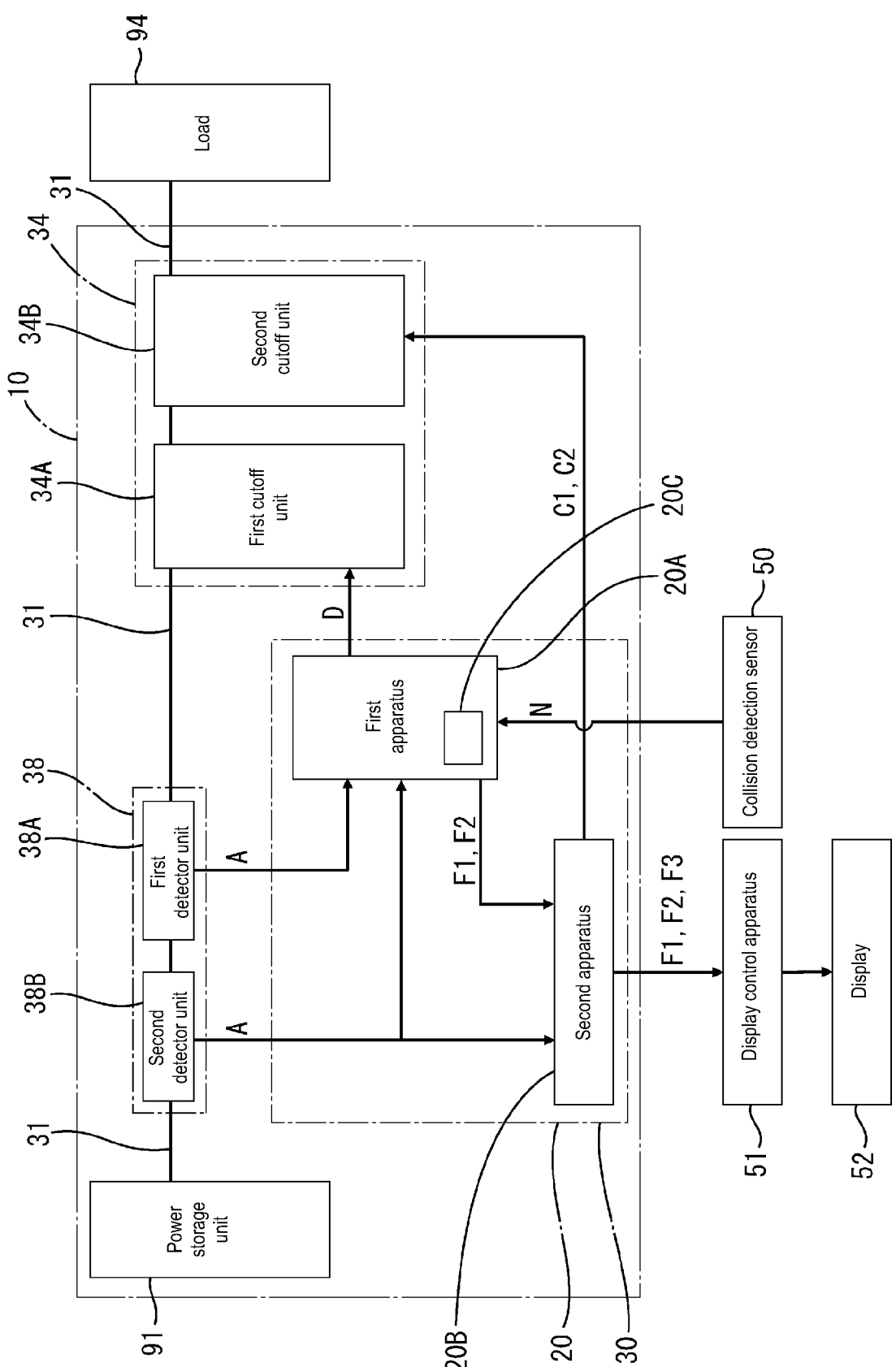
FIG. 1 is a block diagram depicting a vehicle-mounted system equipped with a cutoff control apparatus according to a first embodiment.

Embodiments of the present disclosure will first be listed and described in outline.

A cutoff control apparatus according to the present disclosure controls a cutoff unit in a vehicle-mounted system, the vehicle-mounted system including: a power storage unit; a power line, which is a line through which power is transferred between the power storage unit and a load; and the cutoff unit that switches between a cutoff state that cuts off supplying of power from the power storage unit side to the load side on the power line and a canceled state where the cutoff state is canceled. The vehicle-mounted system is a system where the cutoff unit includes a first cutoff unit and a second cutoff unit, and the second cutoff unit enters the cutoff state when a first overcurrent state has occurred on the power line when the first cutoff unit is in the canceled state. The cutoff control apparatus includes a control apparatus for instructing the first cutoff unit to switch to the cutoff state when the power line is in a second overcurrent state.

The cutoff control apparatus according to (1) above can be used in a system where it is possible, when a power line is in the first overcurrent state, to switch a second cutoff unit to a cutoff state while keeping the first cut-off unit in a canceled state. In the above system, the cutoff control apparatus can switch the first cutoff unit to the cutoff state for protection purposes when the power line has entered a second overcurrent state, which enables to different control to be performed for the first overcurrent state and the second overcurrent state. Accordingly, the cutoff control apparatus described above considers a plurality of overcurrent states and can perform appropriate control for each overcurrent state.

In the cutoff control apparatus according to (1) above, the control apparatus may instruct the first cutoff unit to switch to the cutoff state when a collision detection sensor has detected a collision of a vehicle.

As one example, the apparatus in U.S. Pat. No. 9,221,343 can immediately stop the supplying of electric power from a high-voltage battery to a plurality of loads when a vehicle has collided and can thereby prevent electric leakage to the vehicle body. However, the cause of electrical leakage from a high-voltage battery to a vehicle body is not limited to the vehicle colliding. The apparatus in U.S. Pat. No. 9,221,343 cannot prevent electrical leakage from a high-voltage battery to a vehicle body due to causes aside from a collision of the vehicle. On the other hand, with the cutoff control apparatus according to (2) above, it is possible to cut off the supplying of power from the power storage unit to the load and favorably prevent leakage from the power storage unit to the vehicle body not only in response to a collision of the vehicle but also depending on the state of the current on the power line.

In the cutoff control apparatus according to (1) or (2) above, the vehicle-mounted system may include a first detector unit that detects a state of a current flowing through the power line and a second detector unit that detects a state of a current flowing through the power line, and the control apparatus may instruct the first cutoff unit to switch to the cutoff state when a detection result of either the first detector unit or the second detector unit indicates the second overcurrent state.

The cutoff control apparatus according to (3) above is capable, even when one of the first detector unit and the second detector unit has malfunctioned, of continuously detecting the state of the current on the power line using the other detector unit.

In the cutoff control apparatus according to (3) above, when the second detector unit has malfunctioned, the control apparatus may notify a periphery that the second detector unit has malfunctioned.

The cutoff control apparatus according to (4) above is capable of facilitating appropriate control of the operations of the vehicle in response to the second detector unit malfunctioning.

In the cutoff control apparatus according to (3) or (4) above, when the first detector unit has malfunctioned, the control apparatus may instruct the first cutoff unit to switch to the cutoff state based on the detection result of the second detector unit.

The cutoff control apparatus according to (5) above is capable, even when the first detector unit has malfunctioned, of continuously detecting the current state on the power line using the second detector unit and can continue performing control that switches the first cutoff unit to the cutoff state.

In the cutoff control apparatus according to any one of (1) to (5) above, a magnitude of a current flowing through the power line in the first overcurrent state is equal to or greater than a first threshold and a magnitude of a current flowing through the power line in the second overcurrent state is equal to or greater than a second threshold. The first threshold may be smaller than the second threshold.

The cutoff control apparatus according to (6) above can appropriately switch each cutoff unit to the cutoff state in accordance with the magnitude of the current flowing through the power line.

In the cutoff control apparatus according to any one of (2) to (5) or (6) when directly or indirectly depending on (2), the control apparatus includes a first apparatus and a second apparatus. The first apparatus may switch the first cutoff unit to the cutoff state when the collision detection sensor has given notification of a collision of a vehicle or when the second overcurrent state has occurred, and the second apparatus may switch the second cutoff unit to the cutoff state when the first overcurrent state has occurred.

With the cutoff control apparatus according to (7), it is easy to make the control apparatuses individually handle the respective cutoff units, which makes it easy to perform switching control to a cutoff state that is specialized to the characteristics of each cutoff unit.

In the cutoff control apparatus according to (7), when the first apparatus has malfunctioned, the second apparatus may switch the second cutoff unit to the cutoff state.

The cutoff control apparatus according to (8) above switches the second cutoff unit to the cutoff state when control by the two control apparatuses, that is, the first apparatus and the second apparatus, is no longer operational, which means it is possible to limit the supplying of power from the power storage unit to the load when redundancy cannot be maintained for the control apparatus.

In the cutoff control apparatus according to (8), when the first apparatus has malfunctioned, the second apparatus may notify the periphery that the first apparatus has malfunctioned.

The cutoff control apparatus according to (9) above facilitates appropriate control over the operation of the vehicle in response to the first apparatus malfunctioning.

In the cutoff control apparatus according to (1) above, the vehicle-mounted system includes a detector unit configured to detect a state of a current flowing through a current path. The control apparatus controls cutting off by the first cutoff unit based on a detection result of the detector unit and a first cutoff characteristic that sets a time until cutoff when a current of each current value flows through the first cutoff unit. The control apparatus controls cutting off by the second cutoff unit based on a detection result of the detector unit and a second cutoff characteristic that sets a time until cutoff when a current of each current value flows through the second cutoff unit. The first overcurrent state is a state where a cutoff condition based on the second cutoff characteristic is satisfied by the current flowing through the power line and a time for which the current flows through the power line, and the second overcurrent state is a state where a cutoff condition based on the first cutoff characteristic is satisfied by the current flowing through the power line and a time for which the current flows through the power line. The time until cutoff when a current of each current value flows is shorter for the second cutoff characteristic than for the first cutoff characteristic.

The cutoff control apparatus according to (10) above can control each of the first cutoff unit and the second cutoff unit according to individual cutoff characteristics. The cutoff control apparatus can cut off the second cutoff unit earlier than the first cutoff unit, which is advantageous in a usage environment where it is desirable to cut off the second cutoff unit earlier than the first cutoff unit.

The first cut-off characteristic is a characteristic that sets the time until cut-off when currents of different current values flow through the first cutoff unit. As one example, the first cutoff characteristic is defined, when $I1$ is the "current value flowing through the first cutoff unit" and $t1$ is the "time until cutoff" when a current of the current value $I1$ flows through the first cutoff unit, as the relationship between the current value $I1$ and the time $t1$ for each current value in at least a predetermined first current range. For at least current values in the first current range, a case where a current of that current value or higher has continuously flowed through the first cutoff unit for at least the "time until cutoff" set corresponding to that current value in the first cutoff characteristic is "a state where a cutoff condition based on the first cutoff characteristic is satisfied".

In the same way, the second cut-off characteristic is a characteristic that sets the time until cut-off when currents of different current values flow through the second cutoff unit. As one example, the second cutoff characteristic is defined, when I2 is the "current value flowing through the second cutoff unit" and t2 is the "time until cutoff" when a current of the current value I2 flows through the second cutoff unit, as the relationship between the current value I2 and the time t2 for each current value in at least a predetermined second current range. For at least current values in the second current range, a case where a current of that current value or higher has continuously flowed through the second cutoff unit for at least the "time until cutoff" set corresponding to that current value in the second cutoff characteristic is "a state where a cutoff condition based on the second cutoff characteristic is satisfied".

In the cutoff control apparatus according to (10), the vehicle-mounted system includes a relay that switches between the cutoff state and the canceled state. The control apparatus controls cutting off by the relay based on a detection result of the detector unit and a third cutoff characteristic that sets a time until cutoff when a current of each current value flows through the relay. The time until cutoff when a current of each current value flows may be shorter for the first cutoff characteristic and the second cutoff characteristic than for the third cutoff characteristic.

The cutoff control apparatus according to (11) above can switch the first cutoff unit and the second cutoff unit to the cutoff state to prevent the relay from breaking due to arcing that occurs within the relay as it switches to the cutoff state and thereby protect the relay.

The third cut-off characteristic is a characteristic that sets the time until cut-off when currents of different current values flow through the relay. As one example, the third cutoff characteristic is defined, when I3 is the "current value flowing through the relay" and t3 is the "time until cutoff" when a current of the current value I3 flows through the relay, as the relationship between the current value I3 and the time t3 for each current value in at least a predetermined third current range. For at least current values in the third current range, a case where a current of that current value or higher has continuously flowed through the relay for at least the "time until cutoff" set corresponding to that current value in the third cutoff characteristic is "a state where a cutoff condition based on the third cutoff characteristic is satisfied".

First Embodiment

Overview of Vehicle-Mounted System

A vehicle-mounted system 10 depicted in FIG. 1, which includes a cutoff control apparatus 30, is configured as a vehicle-mounted power supplying system and is provided with a power storage unit 91, a power line 31, a cutoff unit 34, a detector unit 38, a control apparatus 20 provided inside the cutoff control apparatus 30, and the like. The vehicle-mounted system 10 is configured so as to be capable of applying a voltage to a load 94 from the power storage unit 91 via the power line 31, which is a path on which electric power is transferred between the power storage unit 91 and the load 94.

The power storage unit 91 is a DC power supply that produces a DC voltage, and as examples uses a power supplying means such as a lead-acid battery, a LiB, an alternator, or a converter. The power storage unit 91 is provided with a high potential-side terminal and a low potential-side terminal, the high potential-side terminal is electrically connected to the power line 31, and the low potential-side terminal is electrically connected to ground, for example. The power storage unit 91 is configured to apply a predetermined output voltage to the power line 31.

The power line 31 is a power line through which electric power is transferred between the power storage unit 91 and the load 94, and is electrically connected to both the power storage unit 91 and the load 94.

The load 94 is a vehicle-mounted electronic component, and as examples may refer to products such as electric components, ECUs, and ADAS-related components. The load 94 is electrically connected to the power line 31.

In the present disclosure, the expression "electrically connected" preferentially refers to a configuration in which objects are connected in a conductive state (that is, a state where a current can flow) so that the respective potentials of the two connected objects become equal. However, the expression "electrically connected" is not limited to this configuration. As another example, the expression "electrically connected" may refer to a configuration in which two connected objects are connected in a conductive state with another electric component interposed between them.

The cutoff unit 34 includes a first cutoff unit 34A and a second cutoff unit 34B. The cutoff unit 34 switches between a cutoff state, where supplying of power from the power storage unit 91 side to the load 94 side on the power line 31 is cut off, and a canceled state where the cutoff state is canceled. The first cutoff unit 34A is interposed on the power line 31 closer to the power storage unit 91 than the second cutoff unit 34B, and the second cutoff unit 34B is interposed on the power line 31 closer to the load 94 than the first cutoff unit 34A. As one example, a pyro-fuse or the like is used as the first cutoff unit 34A. The first cutoff unit 34A enters a cutoff state that cuts off the supplying of electric power from the power storage unit 91 side to the load 94 side on the power line 31 when a drive signal D is provided from a first apparatus 20A of the control apparatus 20, described later, and thereby stops the supplying of power from the power storage unit 91 side to the load 94 side.

As one example, when the drive signal D is applied to a pyro-fuse, gunpowder provided inside the pyro-fuse ignites and the explosive force of the gunpowder is used to instantly split an internally provided conductive path that electrically connects the power line 31 on the power storage unit 91 side and the power line 31 on the load 94 side, thereby producing the cutoff state. This means that the pyro-fuse can place the power line 31 in the cutoff state in a shorter time than a relay or the like. The first cutoff unit 34A that has switched to the cutoff state does not switch to the canceled state where the cutoff state is canceled and the supplying of power from the power storage unit 91 side to the load 94 side is permitted.

As examples, a relay, an FET, a transistor, or the like is used for the second cutoff unit 34B. When provided with a cutoff signal C1 from a second apparatus 20B of the control apparatus 20, described later, the second cutoff unit 34B switches to a cutoff state where the supplying of electric power from the power storage unit 91 side to the load 94 side on the power line 31 is cut off. When a conduction signal C2 is provided from the second apparatus 20B of the control apparatus 20, the second cutoff unit 34B switches to a canceled state where the cutoff state is canceled. The second cutoff unit 34B in the canceled state can supply power from the power storage unit 91 side to the load 94 side via the power line 31. The time taken by the second cutoff unit 34B to place the power line 31 in the cutoff state after receiving the cutoff signal C1 is long compared to the first cutoff unit 34A.

The detector unit 38 includes a first detector unit 38A and a second detector unit 38B. The first detector unit 38A is interposed on the power line 31 closer to the power storage unit 91 than the first cutoff unit 34A. The second detector unit 38B is interposed on the power line 31 closer to the power storage unit 91 than the first detector unit 38A. The first detector unit 38A and the second detector unit 38B include a resistor and a differential amplifier, for example, and are configured to output a value indicating the current flowing through the power line 31 (in more detail, an analog voltage in keeping with the value of the current flowing through the power line 31) as a current value A. In this way the first detector unit 38A and the second detector unit 38B detect the state of the current flowing through the power line 31.

The absolute value of the current value on the power line 31 that can be detected by the first detector unit 38A is greater than the absolute value of the current value A that can be detected by the second detector unit 38B. The input/ output error of the first detector unit 38A is larger than the input/output error of the second detector unit 38B. The input/output error referred to here is the difference between the magnitude of the current flowing through the power line 31 and the current value A indicating the magnitude of this current. The delay time of the first detector unit 38A is shorter than the delay time of the second detector unit 38B. The "delay time" referred to here is the time taken from the timing of input of the current flowing through the power line 31 into a detector unit until the timing at which that detector unit outputs the current value A. The above means that the second detector unit 38B can detect the current on the power line 31 with higher accuracy than the first detector unit 38A. The first detector unit 38A detects the current flowing through the power line 31 faster than the second detector unit 38B.

The cutoff control apparatus 30 is an apparatus that controls the cutoff unit 34. The control apparatus 20 provided in the cutoff control apparatus 30 includes the first apparatus 20A and the second apparatus 20B. Each of the first apparatus 20A and the second apparatus 20B is composed of circuitry, components, and the like which can perform control, such as a microcomputer or an FPGA for example. The first apparatus 20A can operate as a cutoff driving apparatus that switches the first cutoff unit 34A to the cutoff state. The second apparatus 20B can operate as a power monitoring apparatus that switches the second cutoff unit 34B between the cutoff state and the canceled state.

The first apparatus 20A is configured to receive a collision detection signal N, which is outputted from a collision detection sensor 50 provided in the vehicle and gives notification that a collision of the vehicle has been detected. A known sensor, such as a satellite sensor, may be used as the collision detection sensor 50. When a collision of the vehicle has not been detected, the collision detection sensor 50 does not output the collision detection signal N to the first apparatus 20A. Conversely when a collision of the vehicle has been detected, the collision detection sensor 50 outputs the collision detection signal N to the first apparatus 20A. When the collision detection sensor 50 has detected a collision of the vehicle and outputted the collision detection signal N to the first apparatus 20A, the first apparatus 20A outputs the drive signal D to the first cutoff unit 34A to instruct the first cutoff unit 34A to switch to the cutoff state.

In addition, the first apparatus 20A is configured to receive the current value A on the power line 31 that has been detected by each of the first detector unit 38A and the second detector unit 38B. The first apparatus 20A controls the outputting of the drive signal D to the first cutoff unit 34A based on the current value A, which is the detection result inputted from either the first detector unit 38A or the second detector unit 38B. In more detail, when the current value A, which is the detection result of either the first detector unit 38A or the second detector unit 38B, indicates a second overcurrent state, the first apparatus 20A provides the drive signal D to the first cutoff unit 34A to instruct the first cutoff unit 34A to switch to the cutoff state. That is, the first apparatus 20A switches the first cutoff unit 34A to the cutoff state when the collision detection sensor 50 has detected a collision of the vehicle or when the second overcurrent state has occurred. Note that the second over-current state will be described later.

The first apparatus 20A is configured to monitor whether the first detector unit 38A is malfunctioning. When the first apparatus 20A has determined that the first detector unit 38A is not malfunctioning, the first apparatus 20A controls the outputting of the drive signal D to the first cutoff unit 34A based on the current value A inputted from the first detector unit 38A.

The first apparatus 20A is configured so that when it has been determined that the first detector unit 38A is malfunctioning, the first apparatus 20A outputs the drive signal D to the first cutoff unit 34A based on the current value A that is the detection result of the second detector unit 38B to instruct the first cutoff unit 34A to switch to the cutoff state. In more detail, when it has been determined that the first detector unit 38A is malfunctioning, or when the current value A inputted from the second detector unit 38B indicates the second overcurrent state, the first apparatus 20A provides the first cutoff unit 34A with the drive signal D to instruct the first cutoff unit 34A to switch to the cutoff state. When it has been determined that the first detector unit 38A is malfunctioning, the first apparatus 20A outputs a first detector unit failure signal F1 indicating that the first detector unit 38A is malfunctioning to the second apparatus 20B.

An example configuration whereby the first apparatus 20A determines whether the first detector unit 38A is malfunctioning will now be described. The first apparatus 20A is configured to monitor the current value A inputted from the first detector unit 38A at intervals of a predetermined time. As one example, the first apparatus 20A is configured to store a plurality of current values A inputted from the first detector unit 38A at intervals of the predetermined time. The first apparatus 20A compares an average value of the stored plurality of current values A with the magnitude of a present current value A (that is, the latest current value A) inputted from the first detector unit 38A. When, as a result of this comparison, the difference between the presently inputted current value A and the average value of the stored plurality of current values A is equal to or greater than a predetermined value, the first apparatus 20A determines that the first detector unit 38A has malfunctioned. In other words, a state where the first detector unit 38A is incapable of outputting the current value A corresponding to the current on the power line 31 is handled as a state where the first detector unit 38A has malfunctioned.

In addition, the first apparatus 20A is configured to be capable of determining whether the first apparatus 20A itself has malfunctioned. The first apparatus 20A itself is regarded as having malfunctioned in a state where the first cutoff unit 34A cannot be switched to the cutoff state either when the collision detection sensor 50 has detected a collision of the vehicle or when the second overcurrent state has occurred, and/or in a state where it is not possible to determine whether the first detector unit 38A has malfunctioned. The first apparatus 20A is provided with a monitoring unit 20C for monitoring the state of each electronic component that constructs the first apparatus 20A. As one example, the monitoring unit 20C is composed of a microcomputer or the like. When any of the electronic components constructing the first apparatus 20A has malfunctioned, the monitoring unit 20C gives notification of such malfunctioning. When the monitoring unit 20C has detected malfunctioning, the first apparatus 20A outputs a first apparatus failure signal F2 indicating that the first apparatus 20A itself has malfunctioned to the second apparatus 20B.

The current value A on the power line 31 detected by the second detector unit 38B is inputted into the second apparatus 20B. When a first overcurrent state has occurred with the first cutoff unit 34A in the canceled state, the second apparatus 20B provides the cutoff signal C1 to the second cutoff unit 34B to switch the second cutoff unit 34B to the cutoff state. When the current value A inputted from the second detector unit 38B is not in the first overcurrent state and not in the second overcurrent state, the second apparatus 20B provides the conduction signal C2 to the second cutoff unit 34B to place the second cutoff unit 34B in the canceled state.

First Overcurrent State and Second Overcurrent State

The first overcurrent state and the second overcurrent state will now be described. In the first overcurrent state, the magnitude of the current flowing through the power line 31 is equal to or greater than a first threshold and less than a second threshold, which is greater than the first threshold. That is, the first threshold is smaller than the second threshold. The first overcurrent state is determined at the second apparatus 20B using the current value A inputted from the second detector unit 38B. In more detail, a situation where the magnitude of the current value A inputted from the second detector unit 38B into the second apparatus 20B (that is, the current flowing on the power line 31) is determined to be equal to or greater than a first threshold but lower than the second threshold that is greater than the first threshold corresponds to the first overcurrent state.

In the second overcurrent state, the magnitude of the current flowing through the power line 31 is equal to or greater than the second threshold. The second overcurrent state is determined at the first apparatus 20A using the current value A inputted from the first detector unit 38A or the second detector unit 38B. In more detail, a situation where the first apparatus 20A has determined that the magnitude of the current value A inputted from the first detector unit 38A or the second detector unit 38B (that is, the current flowing on the power line 31) is equal to or greater than the second threshold corresponds to the second overcurrent state.

The second apparatus 20B is configured to be capable of determining whether the second detector unit 38B is malfunctioning by monitoring the current value A inputted from the second detector unit 38B at intervals of a predetermined time. As one example, the second apparatus 20B is configured to store a plurality of current values A inputted from the second detector unit 38B at predetermined time intervals. The second apparatus 20B compares the average value of the stored plurality of current values A with the magnitude of a present current value A (that is, the latest current value A) inputted from the second detector unit 38B. When, as a result of this comparison, the difference between the presently inputted current value A and the average value of the stored plurality of current values A is equal to or greater than a predetermined value, the second apparatus 20B determines that the second detector unit 38B has malfunctioned. In other words, a state where the second detector unit 38B cannot output a current value A corresponding to the current on the power line 31 is regarded as a state where the second detector unit 38B has malfunctioned.

The second apparatus 20B is configured so as to output, on determining that the second detector unit 38B has malfunctioned, a second detector unit failure signal F3 indicating that the second detector unit 38B has malfunctioned to notify the periphery that the second detector unit 38B has malfunctioned. In addition, the second apparatus 20B is configured to output the first detector unit failure signal F1 or the first apparatus failure signal F2 to the periphery when the first detector unit failure signal F1 or the first apparatus failure signal F2 has been inputted from the first apparatus 20A. That is, when the first apparatus 20A has malfunctioned, the second apparatus 20B notifies the periphery that the first apparatus 20A has malfunctioned. When the second detector unit 38B has malfunctioned but the first detector unit 38A has not malfunctioned, the first apparatus 20A may perform control to continuously output the drive signal D to the first cutoff unit 34A based on a current value A that is the detection result inputted from the first detector unit 38A. When the second detector unit 38B has malfunctioned, as one example, the second apparatus 20B is configured to continue providing the conduction signal C2 to the second cutoff unit 34B.

The second detector unit failure signal F3, the first detector unit failure signal F1, and the first apparatus failure signal F2 outputted to the periphery are outputted, for example, to a display control apparatus 51 that controls the operation of a display 52 and are outputted via the display control apparatus 51 to the display 52, or a buzzer or the like. As one example, the display 52 is a lamp or the like provided on the dashboard of the vehicle. Alternatively, a configuration where the failure signals F1, F2, and F3 are directly outputted to the display 52 without passing via the display control apparatus 51 so that the display 52 can be directly operated may be used. A configuration where the failure signals F1, F2, and F3 are outputted to an external ECU may also be used.

Operation of Control Apparatus

Figure 2:
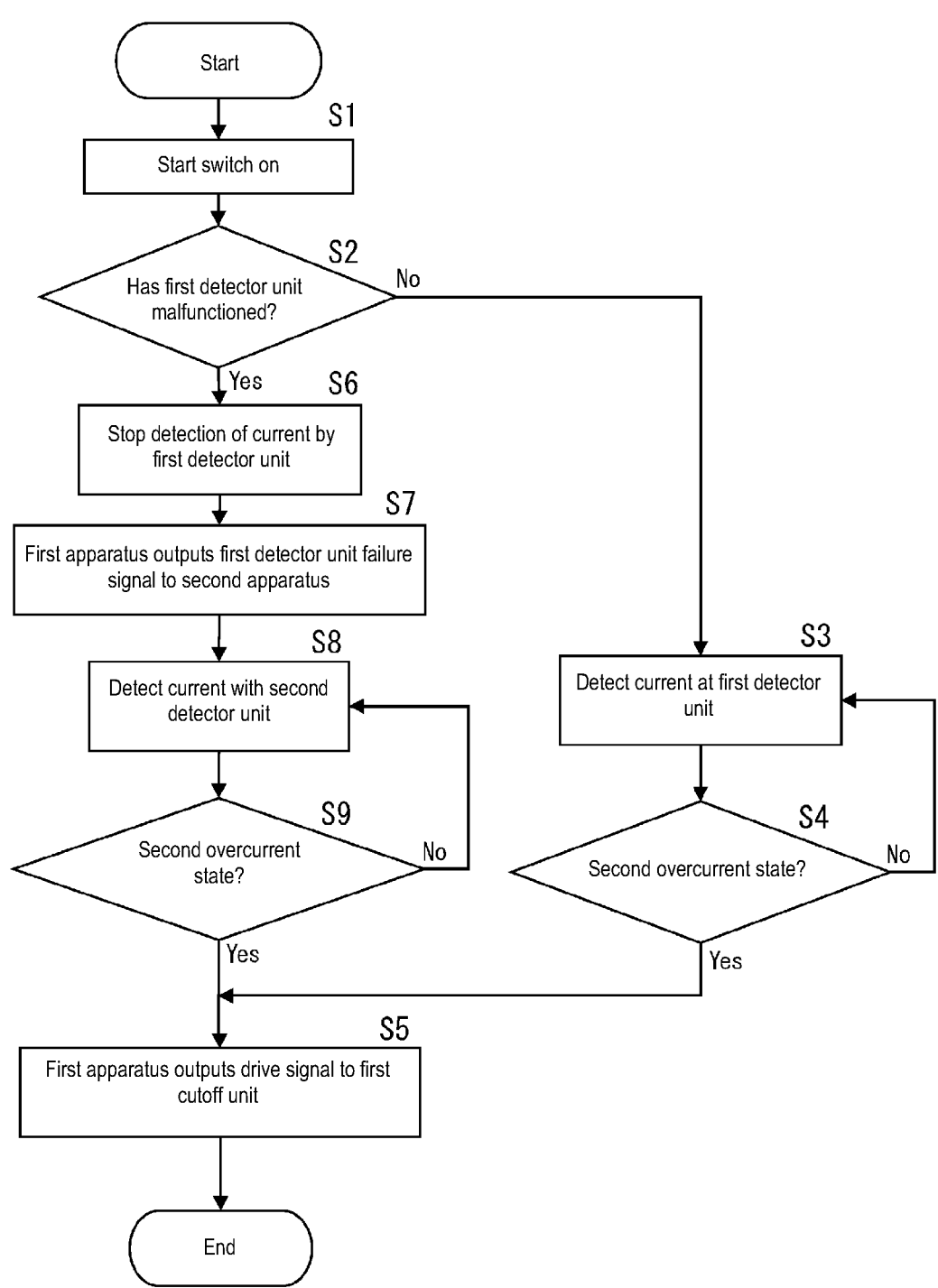
FIG. 2 is a flowchart depicting the flow of processing in the first apparatus of the cutoff control apparatus according to the first embodiment.
Figure 3:
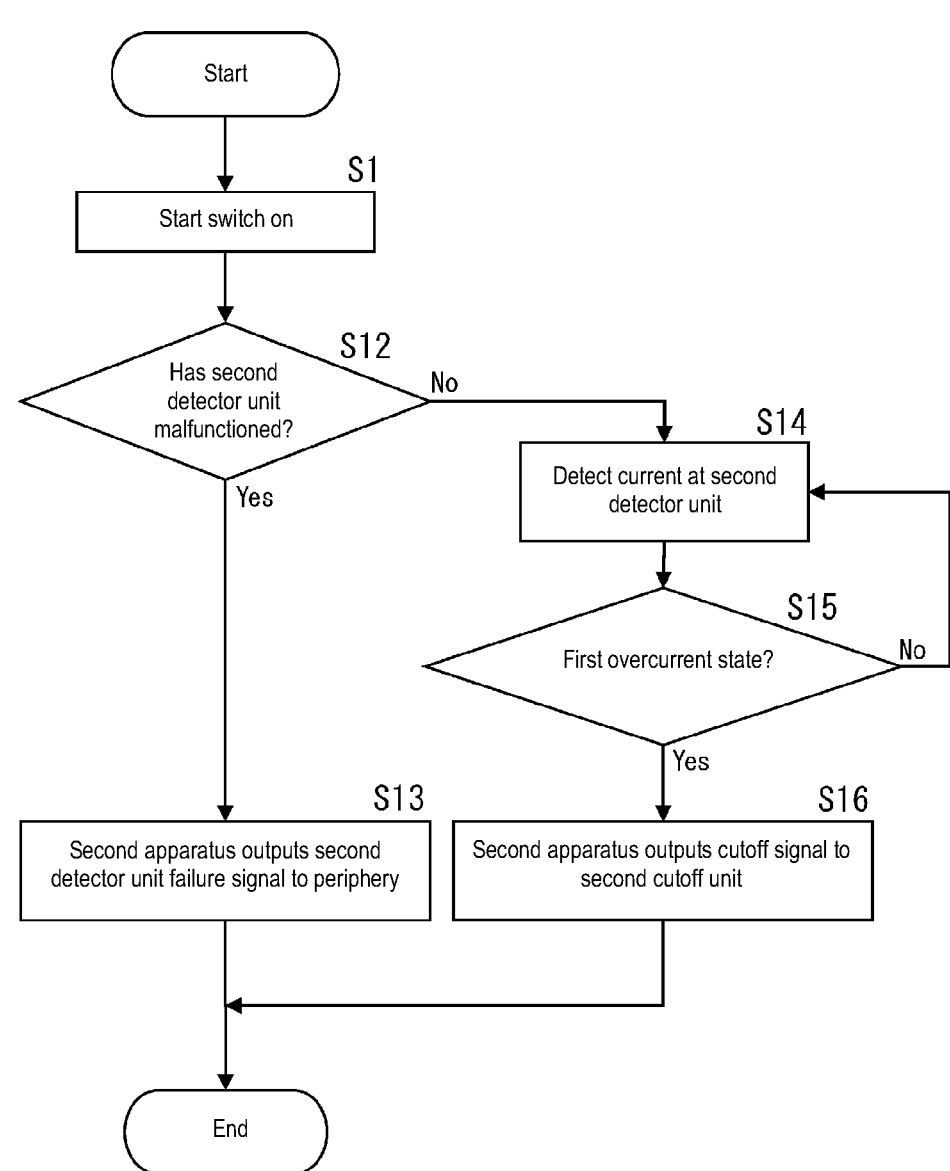
FIG. 3 is a flowchart depicting the flow of processing in a second apparatus of the cutoff control apparatus according to the first embodiment.

Next, an example operation of the control apparatus 20 will be described with reference to FIGS. 2 and 3. The flowchart depicted in FIG. 2 is processing executed by the first apparatus 20A when a predetermined start condition is satisfied, and the flowchart depicted in FIG. 3 is processing executed by the second apparatus 20B when a predetermined start condition is satisfied. The flowcharts depicted in FIGS. 2 and 3 are repeatedly executed in parallel at the first apparatus 20A and the second apparatus 20B.

Control at the First Apparatus

The control executed at the second apparatus 20B will now be described with reference to FIG. 2. First, in step S1, a start switch (or "ignition switch") provided in the vehicle is switched from an off state to an on state. After this, in step S2, the first apparatus 20A determines whether the first detector unit 38A has malfunctioned.

Here, before proceeding to step S2, the first apparatus 20A may determine whether the first apparatus 20A itself is malfunctioning using the monitoring unit 20C. If the monitoring unit 20C has not detected malfunctioning, the first apparatus 20A proceeds to step S2. When the monitoring unit 20C has detected malfunctioning, the first apparatus 20A may output the first apparatus failure signal F2 indicating that the first apparatus 20A itself has malfunctioned to the second apparatus 20B and terminate execution of the processing in FIG. 2.

In step S2, when the first apparatus 20A has determined that the first detector unit 38A is not malfunctioning ("No" in step S2), the processing proceeds to step S3. After proceeding to step S3, the first apparatus 20A detects the current flowing through the power line 31 using the current value A from the first detector unit 38A.

Next, after proceeding to step S4, the first apparatus 20A determines whether the current flowing through the power line 31 is in the second overcurrent state. In more detail, the first apparatus 20A determines whether the current value A on the power line 31 detected by the first detector unit 38A is equal to or greater than the second threshold. When the current value A is equal to or greater than the second threshold, the first apparatus 20A determines that the current flowing through the power line 31 is in the second overcurrent state ("Yes" in step S4), and the processing proceeds to step S5. After proceeding to step S5, the first apparatus 20A transmits the drive signal D to the first cutoff unit 34A and terminates the execution of the processing in FIG. 2.

Note that when the collision detection signal N has been inputted from the collision detection sensor 50, the first apparatus 20A immediately proceeds to step S5 and transmits the drive signal D to the first cutoff unit 34A regardless of whether any of the steps are currently being executed and then terminates the execution of the processing in FIG. 2. In other words, when the collision detection signal N has been inputted from the collision detection sensor 50 that has detected a collision of the vehicle, the first apparatus 20A executes interrupt processing that forcibly transmits the drive signal D to the first cutoff unit 34A.

When, in step S4, the current value A is less than the second threshold, the first apparatus 20A determines that the current flowing through the power line 31 is not in the second overcurrent state ("No" in step S4) and the processing proceeds to step S3. After proceeding to step S3, the first apparatus 20A again detects the current flowing through the power line 31 using the current value A from the first detector unit 38A.

When the first apparatus 20A has determined in step S2 that the first detector unit 38A is malfunctioning ("Yes" in step S2), the processing proceeds to step S6. After proceeding to step S6, the first apparatus 20A stops the detection of current by the first detector unit 38A. As one example, even if the current value A is inputted from the first detector unit 38A, the first apparatus 20A will not use this value. Next, after proceeding to step S7, the first apparatus 20A outputs the first detector unit failure signal F1 indicating that the first detector unit 38A has malfunctioned to the second apparatus 20B.

After proceeding to step S8, the first apparatus 20A detects the current flowing through the power line 31 using the current value A from the second detector unit 38B. In this case, the current value A from the second detector unit 38B is used in each of the first apparatus 20A and the second apparatus 20B. That is, when the first detector unit 38A has malfunctioned, the first apparatus 20A and the second apparatus 20B give instructions to the first cutoff unit 34A and the second cutoff unit 34B about whether to switch to the cutoff state based on the current value A from the second detector unit 38B.

After proceeding to step S9, the first apparatus 20A determines whether the current flowing through the power line 31 is in the second overcurrent state. In more detail, the first apparatus 20A determines whether the current value A of the power line 31 detected by the second detector unit 38B is equal to or greater than the second threshold. When the current value A of the power line 31 detected by the second detector unit 38B is equal to or greater than the second threshold, the first apparatus 20A determines that the current flowing through the power line 31 is in the second overcurrent state ("Yes" in step S9), and the processing proceeds to step S5. After proceeding to step S5, the first apparatus 20A transmits the drive signal D to the first cutoff unit 34A and ends execution of the processing in FIG. 2.

When in step S9, the current value A is below the second threshold, the first apparatus 20A determines that the current flowing through the power line 31 is not in the second overcurrent state ("No" in step S9) and the processing proceeds to step S8. After proceeding to step S8, the first apparatus 20A again detects the current flowing through the power line 31 using the current value A from the second detector unit 38B.

Control at the Second Apparatus

The control executed at the second apparatus 20B will now be described with reference to FIG. 3 and the like. First, in step S1, a start switch (or "ignition switch") provided in the vehicle is switched from an off state to an on state. Next, after proceeding to step S12, the second apparatus 20B determines whether the second detector unit 38B has malfunctioned.

Here, before proceeding to step S12, the second apparatus 20B may determine whether the first detector unit failure signal F1 or the first apparatus failure signal F2 has been inputted from the first apparatus 20A. If the first detector unit failure signal F1 and the first apparatus failure signal F2 have not been inputted from the first apparatus 20A, the second apparatus 20B proceeds to step S12. Also, when the first detector unit failure signal F1 or the first apparatus failure signal F2 has been inputted from the first apparatus 20A, the second apparatus 20B may output the first detector unit failure signal F1 or the first apparatus failure signal F2 to the periphery and terminate the execution of the processing in FIG. 3.

In step S12, when the second apparatus 20B has determined that the second detector unit 38B is malfunctioning ("Yes" in step S12), the processing proceeds to step S13. After proceeding to step S13, the second apparatus 20B outputs the second detector unit failure signal F3 indicating that the second detector unit 38B has malfunctioned, and terminates the execution of the processing in FIG. 3.

In step S12, when the second apparatus 20B has determined that the second detector unit 38B is not malfunctioning ("No" in step S12), the processing proceeds to step S14. After proceeding to step S14, the second apparatus 20B detects the current flowing through the power line 31 using the current value A from the second detector unit 38B.

Next, after proceeding to step S15, the second apparatus 20B determines whether the current flowing through the power line 31 is in the first overcurrent state. In more detail, the second apparatus 20B determines whether the current value A indicating the current flowing in the power line 31 detected by the second detector unit 38B is equal to or greater than a first threshold but less than a second threshold that is greater than the first threshold. When the current value A is equal to or greater than the first threshold but less than the second threshold which is larger than the first threshold, the second apparatus 20B determines that the current flowing through the power line 31 is in the first overcurrent state ("Yes" in step S15), and the processing proceeds to step S16. After proceeding to step S16, the second apparatus 20B transmits the cutoff signal C1 to the second cutoff unit 34B and terminates execution of the processing in FIG. 3.

When, in step S15, the current value A is less than the first threshold, the second apparatus 20B determines that the current flowing through the power line 31 is not in the first overcurrent state ("No" in step S15), and the processing proceeds to step S14. After proceeding to step S14, the second apparatus 20B again detects the current flowing through the power line 31 using the current value A from the second detector unit 38B.

Next, the effect of the present configuration will be described.

The cutoff control apparatus 30 according to the present disclosure controls the cutoff unit 34 in a vehicle-mounted system 10 including a power storage unit 91, a power line 31 that is a path through which power is transferred between the power storage unit 91 and the load 94, and the cutoff unit 34 that switches between a cutoff state where the supplying of power from the power storage unit 91 side to the load 94 side on the power line 31 is cut off and a canceled state where the cutoff state is canceled. The vehicle-mounted system 10 is a system where the cutoff unit 34 includes the first cutoff unit 34A and the second cutoff unit 34B, and the second cutoff unit 34B enters a cutoff state when the first overcurrent state has occurred on the power line 31 while the first cutoff unit 34A is in the canceled state. The cutoff control apparatus 30 includes a control apparatus 20 that instructs the first cutoff unit 34A to switch to the cutoff state when the power line 31 is in the second overcurrent state. This configuration can be applied to a system where the second cutoff unit 34B may be switched to the cutoff state with the first cutoff unit 34A kept in the canceled state when the power line 31 is in the first overcurrent state. In the system described above, the cutoff control apparatus 30 can switch the first cutoff unit 34A to the cutoff state for protection purposes when the power line 31 subsequently reaches the second overcurrent state, which enables different control to be performed between the first overcurrent state and the second overcurrent state. The cutoff control apparatus 30 can therefore consider a plurality of overcurrent states and perform appropriate control for each overcurrent state.

The control apparatus 20 of the cutoff control apparatus 30 according to the present disclosure instructs the first cutoff unit 34A to switch to the cutoff state when the collision detection sensor 50 has detected a collision of the vehicle. According to this configuration, it is possible to cut off the supplying of power from the power storage unit 91 to the load 94 and favorably prevent leakage from the power storage unit to the vehicle body not only in response to a collision of the vehicle but also depending on the state of the current on the power line 31.

The vehicle-mounted system 10 according to the present disclosure includes the first detector unit 38A that detects the state of the current flowing through the power line 31 and the second detector unit 38B that also detects the state of the current flowing through the power line 31. The control apparatus 20 instructs the first cutoff unit 34A to switch to the cutoff state when the detection result of either the first detector unit 38A or the second detector unit 38B indicates the second overcurrent state. According to this configuration, even when one of the first detector unit 38A and the second detector unit 38B has malfunctioned, it is still possible for the cutoff control apparatus 30 to continue detecting the state of the current on the power line 31 using the other detector unit.

When the second detector unit 38B has malfunctioned, the control apparatus 20 of the cutoff control apparatus 30 of the present disclosure notifies the periphery that the second detector unit 38B has malfunctioned. According to this configuration, the cutoff control apparatus 30 facilitates appropriate control over the operation of the vehicle in response to the second detector unit 38B malfunctioning.

When the first detector unit 38A has malfunctioned, the control apparatus 20 of the cutoff control apparatus 30 according to the present disclosure instructs the first cutoff unit 34A to switch to the cutoff state based on the detection result of the second detector unit 38B. According to this configuration, even when the first detector unit 38A has malfunctioned, the cutoff control apparatus 30 can continue detecting the current state on the power path 31 using the second detector unit 38B and can continue performing control that switches the first cutoff unit 34A to the cutoff state.

For the cutoff control apparatus 30 according to the present disclosure, in the first overcurrent state, the magnitude of the current flowing through the power line 31 is equal to or greater than the first threshold, and in the second overcurrent state, the magnitude of the current flowing through the power line 31 is equal to or greater than the second threshold, with the first threshold being smaller than the second threshold. According to this configuration, the cutoff control apparatus 30 can appropriately switch each cutoff unit to the cutoff state in accordance with the magnitude of the current flowing through the power line 31.

The control apparatus 20 of the cutoff control apparatus 30 according to the present disclosure includes the first apparatus 20A and the second apparatus 20B. The first apparatus 20A switches the first cutoff unit 34A to the cutoff state when the collision detection sensor 50 has detected a collision of the vehicle or when the second overcurrent state has occurred. The second apparatus 20B switches the second cutoff unit 34B to the cutoff state when the first overcurrent state has occurred. According to this configuration, it is easy to make the control apparatuses 20 in the cutoff control apparatus 30 individually handle the respective cutoff units, which makes it easy to perform switching control to a cutoff state that is specialized to the characteristics of each cutoff unit.

In the cutoff control apparatus 30 according to the present disclosure, when the first apparatus 20A has malfunctioned, the second apparatus 20B notifies the periphery that the first apparatus 20A has malfunctioned. According to this configuration, the cutoff control apparatus 30 can facilitate appropriate control of the operation of the vehicle in response to the first apparatus 20A malfunctioning.

Second Embodiment

A vehicle-mounted system 110 with a cutoff control apparatus 130 according to a second embodiment differs from the first embodiment in the configuration of the power line 131, the cutoff unit 134, and the detector unit 138, and also by including a relay 136 and a temperature detector unit 137. Configurations that are the same as those in the first embodiment have been assigned the same reference numerals, and description of their structures, functions and effects is omitted.

Overview of Vehicle-Mounted System

Figure 4:
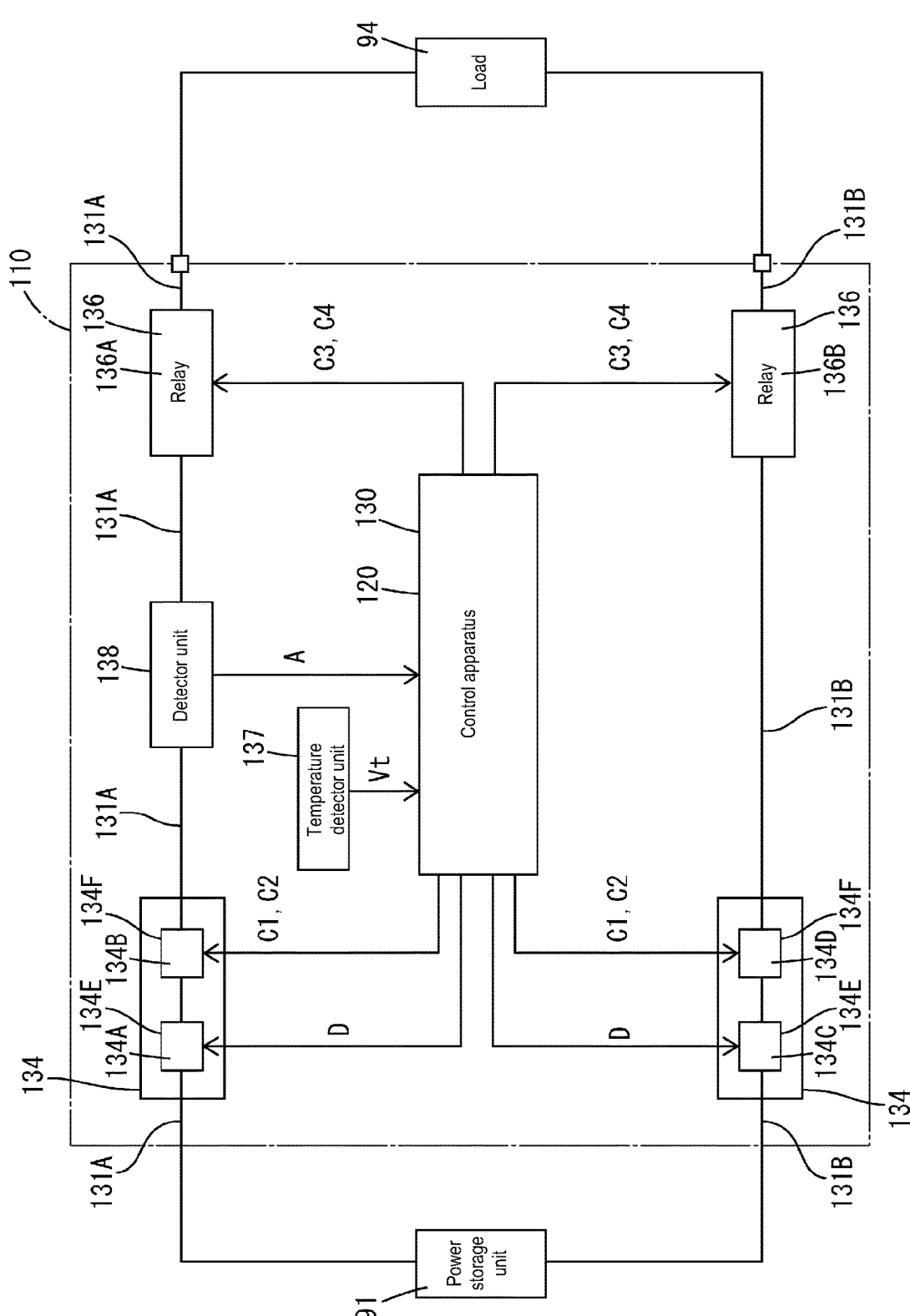
FIG. 4 is a block diagram depicting a vehicle-mounted system provided with a cutoff control apparatus according to a second embodiment.

The vehicle-mounted system 110 depicted in FIG. 4 including the cutoff control apparatus 130 is equipped with the power storage unit 91, the power line 131, the cutoff unit 134, the detector unit 138, the relay 136, the temperature detector unit 137, the control apparatus 120 (the cutoff control apparatus 130), and the like.

The power line 131 includes a high potential-side power line 131A and a low potential-side power line 131B. A high-potential-side terminal of the power storage unit 91 is electrically connected to the high potential-side power line 131A. The low potential-side terminal of the power storage unit 91 is electrically connected to the low potential-side power line 131B. The power storage unit 91 generates a predetermined potential difference (that is, an output voltage) between the high potential-side power line 131A and the low potential-side power line 131B.

The high potential-side power line 131A is electrically connected to a positive electrode of the load 94. The low potential-side power line 131B is electrically connected to a ground electrode of the load 94.

The cutoff unit 134 includes a first cutoff unit 134E and a second cutoff unit 134F. The first cutoff unit 134E includes a first high potential-side cutoff unit 134A and a first low potential-side cutoff unit 134C. As one example, pyro-fuses or the like are used for the first high potential-side cutoff unit 134A and the first low potential-side cutoff unit 134C. The second cutoff unit 134F includes a second high potential-side cutoff unit 134B and a second low potential-side cutoff unit 134D. As one example, FET are used as the second high potential-side cutoff unit 134B and the second low potential-side cutoff unit 134D.

The first high potential-side cutoff unit 134A and the second high potential-side cutoff unit 134B are interposed on the high-potential-side power line 131A. The first high potential-side cutoff unit 134A is interposed on the high-potential-side power line 131A closer to the power storage unit 91 than the second high potential-side cutoff unit 134B, and the second high potential-side cutoff unit 134B is interposed on the high potential-side power line 131A closer to the load 94 than the first high potential-side cutoff unit 134A. The first low potential-side cutoff unit 134C and the second low potential-side cutoff unit 134D are interposed on the low potential-side power line 131B. The first low-potential-side cutoff unit 134C is interposed on the low potential-side power line 131B closer to the power storage unit 91 than the second low potential-side cutoff unit 134D, and the second low potential-side cutoff unit 134D is interposed on the low potential-side power line 131B closer to the load 94 than the first low potential-side cutoff unit 134C.

The first high potential-side cutoff unit 134A and the first low potential-side cutoff unit 134C are placed in a cutoff state when provided with the drive signal D from the first apparatus 20A of the control apparatus 120. The second high potential-side cutoff unit 134B and the second low potential-side cutoff unit 134D switch to the cutoff state when provided with a cutoff signal C1 from the second apparatus 20B of the control apparatus 120. The second high potential-side cutoff unit 134B and the second low potential-side cutoff unit 134D switch to the canceled state when provided with a conduction signal C2 from the second apparatus 20B of the control apparatus 120.

The detector unit 138 is interposed on the high potential-side power line 131A closer to the load 94 than the second high potential-side cutoff unit 134B. The detector unit 138 includes a resistor and a differential amplifier, for example, and is configured to output a value indicating the current flowing through the high potential-side power line 131A (in more detail, an analog voltage in keeping with the value of the current flowing through the high potential-side power line 131A) as the current value A. That is, the detector unit 138 detects the state of the current flowing through the power line 131.

The relay 136 includes a high potential-side relay 136A and a low potential-side relay 136B. As examples, it is possible to use known contactors, mechanical relays, or the like as the high potential-side relay 136A and the low potential-side relay 136B. The high-potential-side relay 136A is interposed on the high-potential-side power line 131A on the load 94 side of the detector unit 138. The low potential-side relay 136B is interposed on the low potential-side power line 131B closer to the load 94 than the second low potential-side cutoff unit 134D. The high potential-side relay 136A and the low potential-side relay 136B switch to the cutoff state when provided with the cutoff signal C3 from the second apparatus 20B of the control apparatus 120. The high potential-side relay 136A and the low potential-side relay 136B switch to the canceled state when provided with a conduction signal C4 from the second apparatus 20B of the control apparatus 20.

The temperature detector unit 137 is composed of a known temperature sensor, for example, and is disposed in a vicinity of the power line 131 and/or the cutoff unit 134. The temperature detector unit 137 is configured to output a voltage value indicating the temperature of the disposed location (that is, the temperature in the vicinity of the power line 131 and/or the cutoff unit 134) as a temperature value Vt and inputs the temperature value Vt into the control apparatus 120.

The control apparatus 120 provided in the cutoff control apparatus 130 is composed of circuitry and components and the like that are capable of performing control, such as a microcomputer or an FPGA for example. The control apparatus 120 may execute cutoff control based on a cutoff characteristic and cutoff control based on temperature.

Overview of Cutoff Control Based on Cutoff Characteristic

Figure 5:
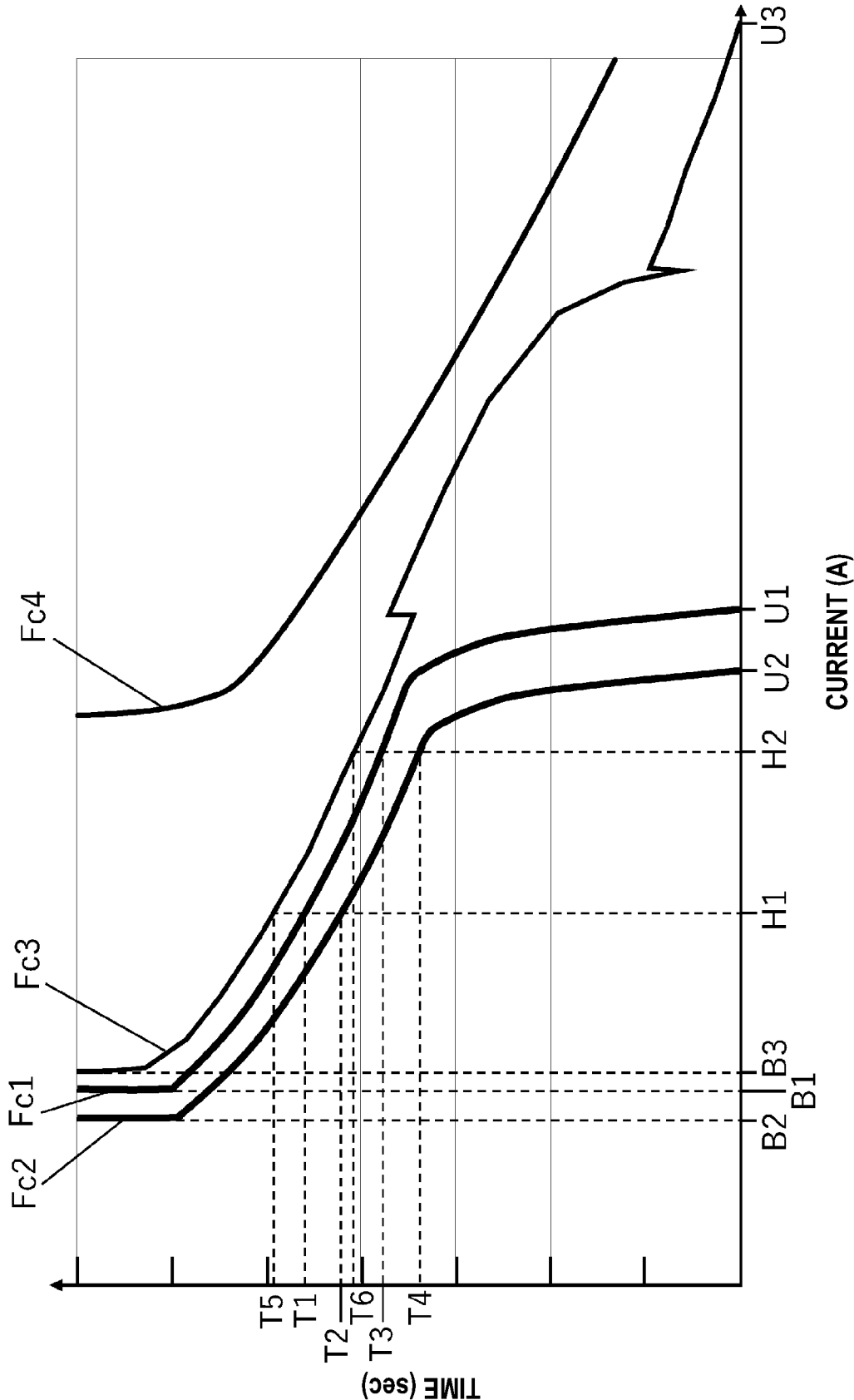
FIG. 5 is a graph illustrating a cutoff characteristic of each cutoff unit and relay, and a tolerated power characteristic of a power line in the second embodiment.

FIG. 5 depicts a first cutoff characteristic Fc1, a second cutoff characteristic Fc2, a third cutoff characteristic Fc3 for each of the first cutoff unit 134E, the second cutoff unit 134F, and the relay 136, and also a tolerated current characteristic Fc4 of the power line 131. The horizontal axis corresponds to the current value A flowing on the high potential-side power line 131A. The vertical axis corresponds to the time for which a current of the current value A flows on the high potential-side power line 131A. The current value A flowing through the high potential-side power line 131A is also the current value A of the current flowing through the cutoff unit 134 and the relay 136. The time for which a current of the current value A flows through the high potential-side power line 131A corresponds to the time for which a current of the current value A flows through the cutoff unit 134 and the relay 136.

As one example, the first cutoff characteristic Fc1, the second cutoff characteristic Fc2, the third cutoff characteristic Fc3, and the tolerated current characteristic Fc4 are stored in a memory of the control apparatus 120 in a format, such as table data or a function, that enables a comparison with the current value A from the detector unit 138. In a graph in which the horizontal axis is the current (each current value A) flowing through the power line 131 and the vertical axis is the time until cut off at that current value A (that is, a graph indicating the current-time characteristics), a curve representing the first cutoff characteristic Fc1 is at a higher position than a curve representing the second cutoff characteristic Fc2. A curve representing the third cutoff characteristic Fc3 is positioned above the curves representing the first cutoff characteristic Fc1 and the second cutoff characteristic Fc2.

The first cutoff characteristic Fc1, the second cutoff characteristic Fc2, and the third cutoff characteristic Fc3 determine the time until switching to the cutoff state when a current with the current value A flows through the first cutoff unit 134E, the second cutoff unit 134F, and the relay 136, respectively. The tolerated current characteristic Fc4 of the power line 131 indicates, for example, the current value A and the conduction time that cause the power line 131 to start smoking (that is, a "smoking characteristic"). The tolerated current characteristic Fc4 is based on the electrical characteristics of electric components, such as electric wires and connectors, of the power line 131, and is obtained by combining the electrical characteristics of such electric components. The tolerated current characteristic Fc4 indicates that the larger the current value A flowing through the power line 131, the shorter the time taken for the power line 131 to start smoking.

As depicted in FIG. 5, when a current of the current value A flows, a switch to the cutoff state happens in a shorter time with the second cutoff characteristic Fc2 of the second cutoff unit 134F than the first cutoff characteristic Fc1 of the first cutoff unit 134E. As one example, the time T2 taken for the second cutoff unit 134F to be cut off according to the second cutoff characteristic Fc2 when the H1(A) current flows in the second cutoff unit 134F (hereinafter simply referred to as the cutoff time T2 of the second cutoff unit 134F) is shorter than the time T1 taken for the first cutoff unit 134E to be cut off according to the first cutoff characteristic Fc1 when the H1(A) current flows in the first cutoff unit 134E (hereinafter simply referred to as the cutoff time T1 of the first cutoff unit 134E). In the same way the cutoff time T4 of the second cutoff unit 134F when an H2(A) current flows in the second cutoff unit 134F is shorter than the cutoff time T3 of the first cutoff unit 134E when an H2(A) current flows in the first cutoff unit 134E.

In addition, the time taken to switch to the cutoff state when a current with the current value A flows is shorter with the first cutoff characteristic Fc1 of the first cutoff unit 134E and the second cutoff characteristic Fc2 of the second cutoff unit 134F than the third cutoff characteristic Fc3 of the relay 136. As one example, the cutoff time T1 of the first cutoff unit 134E and the cutoff time T2 of the second cutoff unit 134F when the current H1(A) flows through the first cutoff unit 134E are shorter than a time T5 until the relay 136 is cut off according to the third cutoff characteristic Fc3 (hereinafter simply referred to as the "cutoff time T5" of the relay 136) when a current of H1(A) flows through the relay 136. In the same way, the cutoff time T3 of the first cutoff unit 134E and the cutoff time T4 of the second cutoff unit 134F when the current of H2(A) flows through the first cutoff unit 134E is shorter than the cutoff time T6 of the relay 136 when the current of H2(A) flows through the relay 136.

When focusing on either current H1 or H2, the cutoff time of the second cutoff unit 134F when a current of H(A) flows through the second cutoff unit 134F is shorter than the cutoff time of the first cutoff unit 134E when the current of H(A) flows through the first cutoff unit 134E. The cutoff time of the first cutoff unit 134E and the cutoff time of the second cutoff unit 134F when a current of H(A) flows through the first cutoff unit 134E is shorter than the cutoff time of the relay 136 when the current of H(A) flows through the relay 136.

The first cutoff characteristic Fc1, the second cutoff characteristic Fc2, and the third cutoff characteristic Fc3 each have a shorter time to switch to the cutoff state when a current of the current value A flows than the time taken for smoking to occur when the current of the current value A flows through the power line 131. In this way due to any of the first cutoff unit 134E, the second cutoff unit 134F, and the relay 136 switching to the cutoff state according to the first cutoff characteristic Fc1, the second cutoff characteristic Fc2, or the third cutoff characteristic Fc3, it is possible to prevent the power line 131 from smoking.

The first cutoff characteristic Fc1, the second cutoff characteristic Fc2, and the third cutoff characteristic Fc3 indicate that the cutoff unit 134 and the relay 136 switch to the cutoff state in a shorter time as the current value A increases. In each of the first cutoff characteristic Fc1, the second cutoff characteristic Fc2, and the third cutoff characteristic Fc3, the minimum values of the current value A for switching to the cutoff state are respectively "B1", "B2", and "B3". B1, B2, B3 are cutoff thresholds for the respective cutoff characteristics. The maximum values of the current value A in each of the first cutoff characteristic Fc1, the second cutoff characteristic Fc2, and the third cutoff characteristic Fc3 are "U1", "U2", and "U3", respectively.

First Overcurrent State, Second Overcurrent State, and Third Overcurrent State

The first overcurrent state is determined at the control apparatus 120 using a detection result from the detector unit 138 and the second cutoff characteristic Fc2. In more detail, the control apparatus 120 determines that the first overcurrent state has occurred when the current value A inputted from the detector unit 138 is a value equal to or higher than the cutoff threshold B2, and a combination of this current value A and the time for which a current of the current value A continuously flows through the power line 131 satisfy a cutoff condition based on the second cutoff characteristic Fc2 (that is, the combination is at a position that is larger than the curve indicating the second cutoff characteristic Fc2). The expression "larger than the curve indicating the second cutoff characteristic Fc2" here refers to a position to the right of the curve indicating the second cutoff characteristic Fc2.

A determination of whether the current value A and the time for which a current of the current value A continuously flows through the power line 131 satisfy a cutoff condition based on the second cutoff characteristic Fc2 could conceivably be made by the following configuration. As one example, when the current flowing through the power line 131 has a value equal to or higher than the cutoff threshold B2, a timer of the control apparatus 120 measures the time for which a current of this value continuously flows through the power line 131. It is then determined whether the current value of the current and the time for which the current continues to flow through the power line 131 are at a larger position than the curve indicating the second cutoff characteristic Fc2.

The second overcurrent state is determined at the control apparatus 120 using a detection result from the detector unit 138 and the first cutoff characteristic Fc1. In more detail, the control apparatus 120 determines that the second overcurrent state has occurred when the current value A inputted from the detector unit 138 is a value equal to or higher than the cutoff threshold B1, and a combination of this current value A and the time for which a current of the current value A continuously flows through the power line 131 satisfy a cutoff condition based on the first cutoff characteristic Fc1 (that is, the combination is at a position that is larger than the curve indicating the first cutoff characteristic Fc1).

A determination of whether the current value A and the time for which a current of the current value A continuously flows through the power line 131 satisfy a cutoff condition based on the first cutoff characteristic Fc1 is made for example, by measuring, when the current flowing through the power line 131 is equal to or above the cutoff threshold B1, the time for which a current of this value continuously flows through the power line 131 using the timer of the control apparatus 120. It is then determined whether the current value of the current and the time for which the current continues to flow through the power line 131 are at a larger position than the curve indicating the first cutoff characteristic Fc1.

In addition, the control apparatus 120 determines that the third overcurrent state has occurred when the current value A that is the detection result of the detector unit 138 is a value equal to or higher than the cutoff threshold B3, and a combination of this current value A and the time for which a current of the current value A continuously flows through the power line 131 satisfy a cutoff condition based on the third cutoff characteristic Fc3 (that is, the combination is at a position that is larger than the curve indicating the third cutoff characteristic Fc3). To determine whether the third overcurrent state has occurred, the timer of the control apparatus 120 is used.

Cutoff Control Based on Cutoff Characteristics by Control Apparatus

Figure 7:
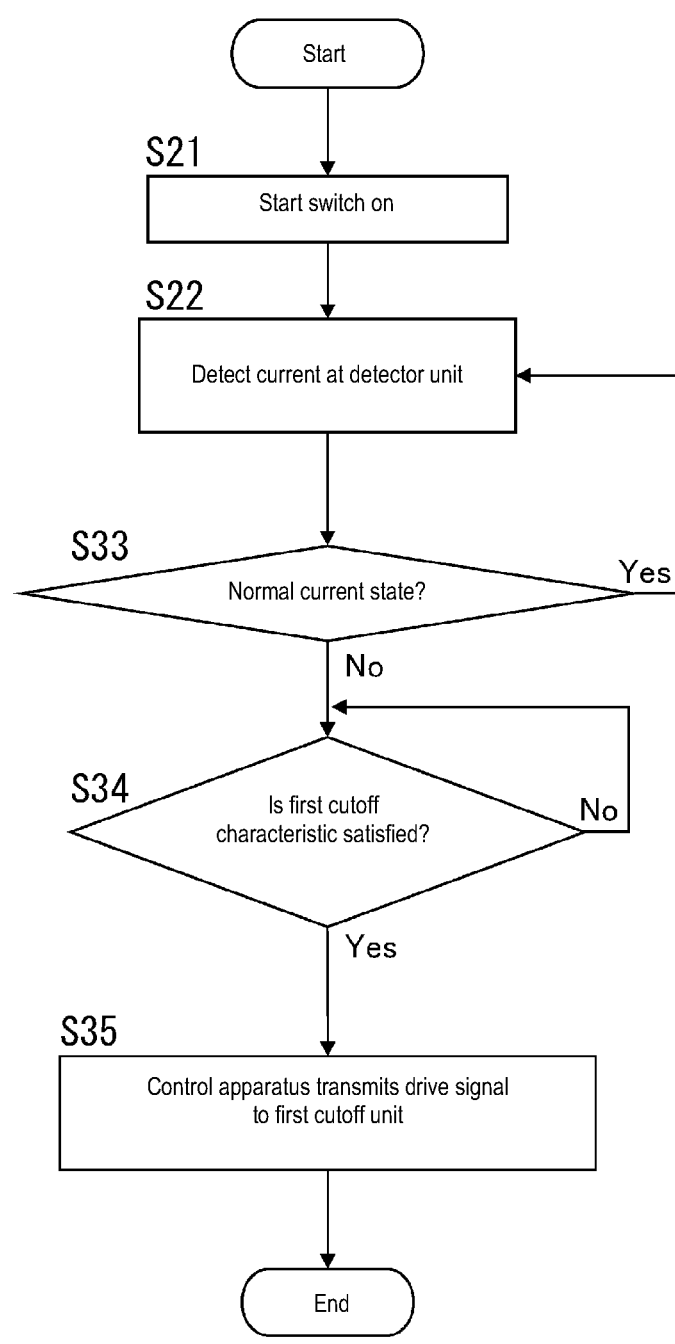
FIG. 7 is a flowchart depicting the flow of cutoff control of a first cutoff unit based on cutoff characteristics at a control apparatus of the cutoff control apparatus according to the second embodiment.
Figure 8:
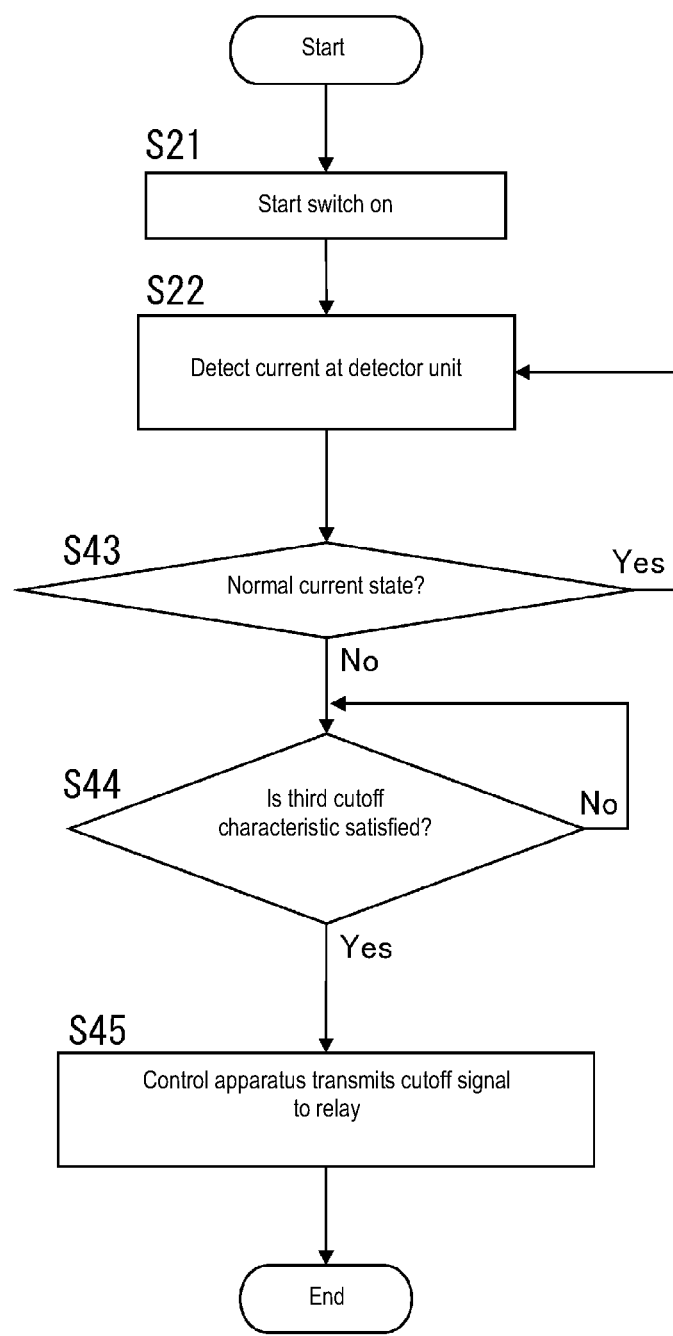
FIG. 8 is a flowchart depicting the flow of cutoff control of a relay based on a cutoff characteristic at a control apparatus of the cutoff control apparatus according to the second embodiment.

Next, an example of cutoff control by the control apparatus 120 based on the cutoff characteristics will be described with reference to FIGS. 6 to 8 and the like. The flowcharts depicted in FIGS. 6 to 8 are processes that are repeatedly executed in parallel by the control apparatus 120 when a predetermined start condition is satisfied.

Figure 6:
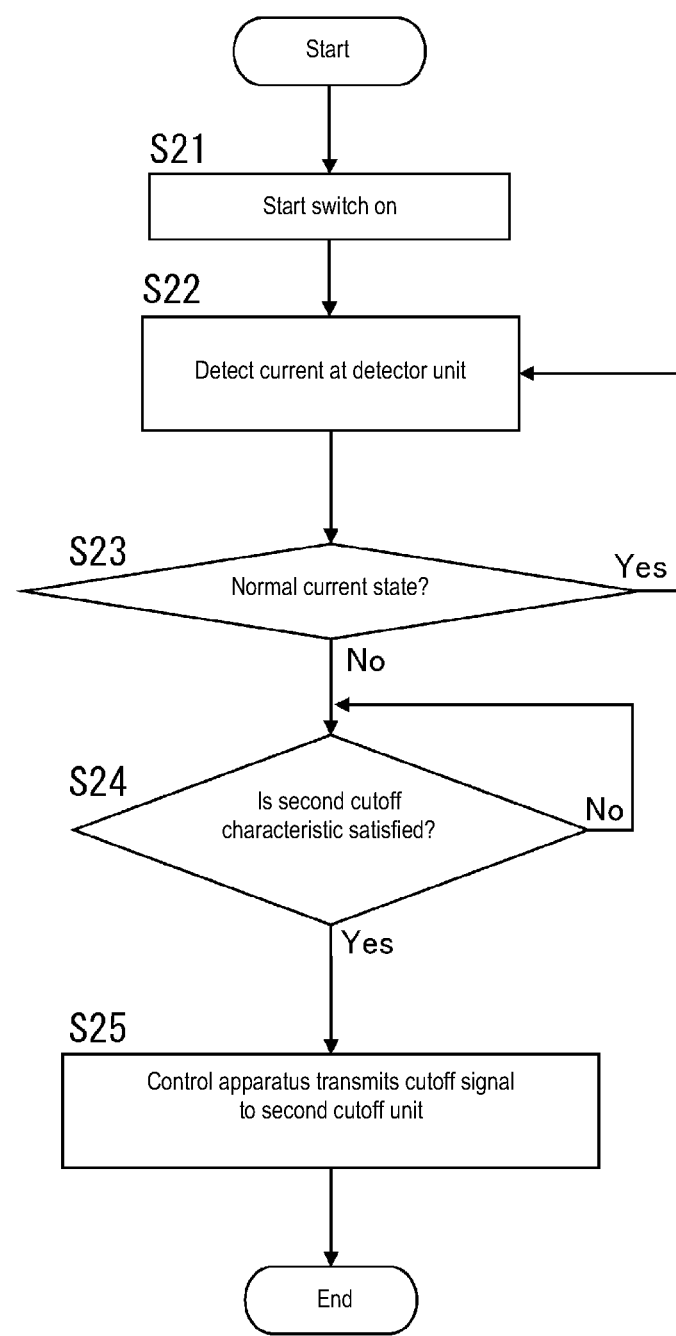
FIG. 6 is a flowchart depicting the flow of cutoff control of a second cutoff unit based on cutoff characteristics at a control apparatus of the cutoff control apparatus according to the second embodiment.

Cutoff Control of Second Cutoff Unit by Control Apparatus Based on the Cutoff Characteristics First, in step S21 depicted in FIG. 6, a start switch (or "ignition switch") provided in the vehicle is switched from an off state to an on state. Next, the process proceeds to step S22. After proceeding to step S22, the control apparatus 120 detects the current flowing through the power line 131 using the current value A from the detector unit 138.

Next, after proceeding to step S23, the control apparatus 120 determines whether the current flowing through the power line 131 is in a normal current state. In more detail, when the control apparatus 120 has determined that the current value A is smaller than the cutoff threshold B2, the control apparatus 120 determines that the current flowing through the power line 131 is in the normal current state ("Yes" in step S23) and the processing proceeds to step S22. When the control apparatus 120 has determined the normal current state, the processing in step S22 is repeated. When the control apparatus 120 has determined that the current value A is equal to or greater than the cutoff threshold B2, the control apparatus 120 determines that the current flowing through the power line 131 is not in the normal current state ("No" in step S23) and the processing proceeds to step S24.

After proceeding to step S24, the control apparatus 120 determines whether the current flowing through the power line 131 and the time for which this current flows through the power line 131 are in a state that satisfies a cutoff condition based on the second cutoff characteristic Fc2. In more detail, the control apparatus 120 determines whether the current value A of the current flowing through the power line 131 and the time for which a current with the current value A (which is equal to or larger than the cutoff threshold B2) has continuously flowed through the power line 131 are at a position that is larger than a curve indicating the second cutoff characteristic Fc2 (that is, whether the current value and the time satisfy a cutoff condition based on the second cutoff characteristic Fc2). In step S24, the control apparatus 120 determines that the current flowing through the power line 131 and the time for which this current flows through the power line 131 satisfy the cutoff condition based on the second cutoff characteristic Fc2. The control apparatus 120 then determines that the state is the first overcurrent state, and the processing proceeds to step S25. In this way, the control apparatus 120 determines the first overcurrent state when the current value A of the current flowing through the power line 131 and the time for which this current continues to flow through the power line 131 satisfy the cutoff condition based on the second cutoff characteristic Fc2.

After proceeding to step S25, the control apparatus 120 transmits the cutoff signal C1 to the second cutoff unit 134F and terminates execution of the processing in FIG. 6. That is, the control apparatus 120 controls cutting off by the second cutoff unit 134F based on the detection result of the detector unit 138 and the second cutoff characteristic Fc2. As one example, when the current value A of the current flowing through the power line 131 and the time for which a current of the current value A (which is equal to or larger than the cutoff threshold B2) continuously flows through the power line 131 are at a smaller position than the curve indicating the first cutoff characteristic Fc1, the first cutoff unit 134E is in the canceled state. That is, the control apparatus 120 provides the cutoff signal C1 to the second cutoff unit 134F when the first overcurrent state occurs while the first cutoff unit 134E is in the canceled state. Also, in step S24, when the control apparatus 120 determines that the current flowing through the power line 131 and the time for which this current flows through the power line 131 do not satisfy a cutoff condition based on the second cutoff characteristic Fc2, execution of step S24 is repeated.

Cutoff Control of First Cutoff Unit by Control Apparatus Based on the Cutoff Characteristics Since steps S21 and S22 depicted in FIG. 7 are the same as steps S21 and S22 in FIG. 6, description thereof is omitted.

In step S33, the control apparatus 120 determines whether the current flowing through the power line 131 is in the normal current state. In more detail, when the control apparatus 120 has determined that the current value A is smaller than the cutoff threshold B1, the control apparatus 120 determines that the current flowing through the power line 131 is in the normal current state ("Yes" in step S33) and the processing proceeds to step S22. When the control apparatus 120 has determined that the current is in the normal current state, the processing in step S22 is repeated. When the control apparatus 120 has determined that the current value A is equal to or greater than the cutoff threshold B1, the control apparatus 120 determines that the current flowing through the power line 131 is not in the normal current state ("No" in step S33), and the processing proceeds to step S34.

After proceeding to step S34, the control apparatus 120 determines that the current value A of the current flowing through the power line 131 and the time for which the current of the current value A (that is equal to or greater than the cutoff threshold B1) continues to flow through the power line 131 are at a position that is larger than the curve indicating the first cutoff characteristic Fc1 (that is, a state where a cutoff condition based on the first cutoff characteristic Fc1 is satisfied). In step S34, the control apparatus 120 determines that the current flowing through the power line 131 and the time for which this current flows through the power line 131 have satisfied the cutoff condition based on the first cutoff characteristic Fc1. The control apparatus 120 determines that the current is in the second overcurrent state, and the processing proceeds to step S35. In this way, when the current value A of the current flowing through the power line 131 and the time for which the current continuously flows through the power line 131 while maintaining the current value A have satisfied the cutoff condition based on the first cutoff characteristic Fc1, the control apparatus 120 determines that the second overcurrent state has occurred.

After proceeding to step S35, the control apparatus 120 transmits the drive signal D to the first cutoff unit 134E and terminates execution of the processing in FIG. 7. That is, the control apparatus 120 controls cutting off by the first cutoff unit 134E based on the detection result of the detector unit 138 and the first cutoff characteristic Fc1. Also, when in step S34, the control apparatus 120 has determined that the current flowing through the power line 131 and the time for which this current flows through the power line 131 do not satisfy a cutoff condition based on the first cutoff characteristic Fc1, execution of step S34 is repeated.

Cutoff Control of Relay by Control Apparatus Based on the Cutoff Characteristic

Since step S21 and step S22 depicted in FIG. 8 are the same as step S21 and step S22 in FIGS. 6 and 7, description thereof is omitted.

In step S43, when the control apparatus 120 has determined that the current value A is smaller than the cutoff threshold B3, the control apparatus 120 determines that the current flowing through the power line 131 is in a normal current state ("Yes" in step S43), and the processing proceeds to step S22. When the control apparatus 120 has determined that the current is in the normal current state, the processing in step S22 is repeated. When the control apparatus 120 has determined that the current value A is equal to or greater than the cutoff threshold B3, the control apparatus 120 determines that the current flowing through the power line 131 is not in the normal current state ("No" in step S43), and the processing proceeds to step S44.

After proceeding to step S44, the control apparatus 120 determines whether the current value A of the current flowing through the power line 131 and the time for which the current of the current value A (that is, equal to or greater than the cutoff threshold B3) continues to flow through the power line 131 are at a position that is larger than the curve indicating the third cutoff characteristic Fc3 (that is, whether a cutoff condition based on the third cutoff characteristic Fc3 is satisfied). In step S44, the control apparatus 120 determines whether the current flowing through the power line 131 and the time for which this current flows through the power line 131 satisfy a cutoff condition based on the third cutoff characteristic Fc3. When doing so, the control apparatus 120 determines that the current is in the third overcurrent state and the processing proceeds to step S45. In this way, when the current value A of the current flowing through the power line 131 and the time for which the current continuously flows through the power line 131 with the current value A satisfy the cutoff condition based on the third cutoff characteristic Fc3, the control apparatus 120 determines that the current is in the third overcurrent state.

After proceeding to step S45, the control apparatus 120 transmits the cutoff signal C3 to the relay 136 and terminates execution of the processing in FIG. 8. That is, the control apparatus 120 controls cutting off by the relay 136 based on the detection result of the detector unit 138 and the third cutoff characteristic Fc3. In step S44, when the control apparatus 120 determines that the current flowing through the power line 131 and the time for which this current flows through the power line 131 are not at a position that is larger than the curve indicating the third cutoff characteristic Fc3, execution of step S44 is repeated. In this way, by executing the control in FIG. 6 to FIG. 8 in parallel, the control apparatus 120 can individually control cutting off by the first cutoff unit 134E, the second cutoff unit 134F, and the relay 136. By doing so, even if any one of the first cutoff unit 134E, the second cutoff unit 134F, and the relay 136 has malfunctioned, the conduction of power on the power line 131 can be reliably cut off.

Overview of Cutoff Control Based on Temperature

The control apparatus 120 may substitute the current value A from the detector unit 138 into a conducted current I into a relational expression regarding heat dissipation and the generation of heat at the power line 131 in Equation 1 indicated below to calculate a temperature rise ΔTw of the power line 131.

$$\Delta Tw(n) = \Delta Tw(n-1) \times \exp(-\Delta t/\tau w) + Rthw \times Rw(n-1) \times I(n-1)^2 \times (1 - \exp(-\Delta t/\tau w)) \quad \text{(Equation 1)}$$

Equation 1 includes a term $(\Delta Tw(n-1) \times \exp(-\Delta t/\tau w))$ relating to the dissipation of heat by the power line 131 and a term $(Rthw \times Rw(n-1) \times I(n-1)^2 \times (1 - \exp(-\Delta t/\tau w)))$ relating to generation of heat by the power line 131. Here, $I(n)$ is the current value (A) of the $n^{th}$ sample (detection), where n is an integer equal to or greater than 1. $\Delta Tw(n)$ is the temperature rise (° C.) of the power line 131 up to the $n^{th}$ sample. $Rw(n)$ is the resistance (Ω) of the power line 131 for the $n^{th}$ sample. $Rw(0)$ is the resistance (Ω) of the power line 131 at a predetermined temperature To (as one example, 20° C.). Rthw is the thermal resistance (in ° C./W) of the power line 131. τw is the heat radiation time constant (s) of the power line 131. Δt is the sampling interval (a predetermined time, expressed in seconds).

Cutoff Control by Control Apparatus Based on Temperature

Figure 9:
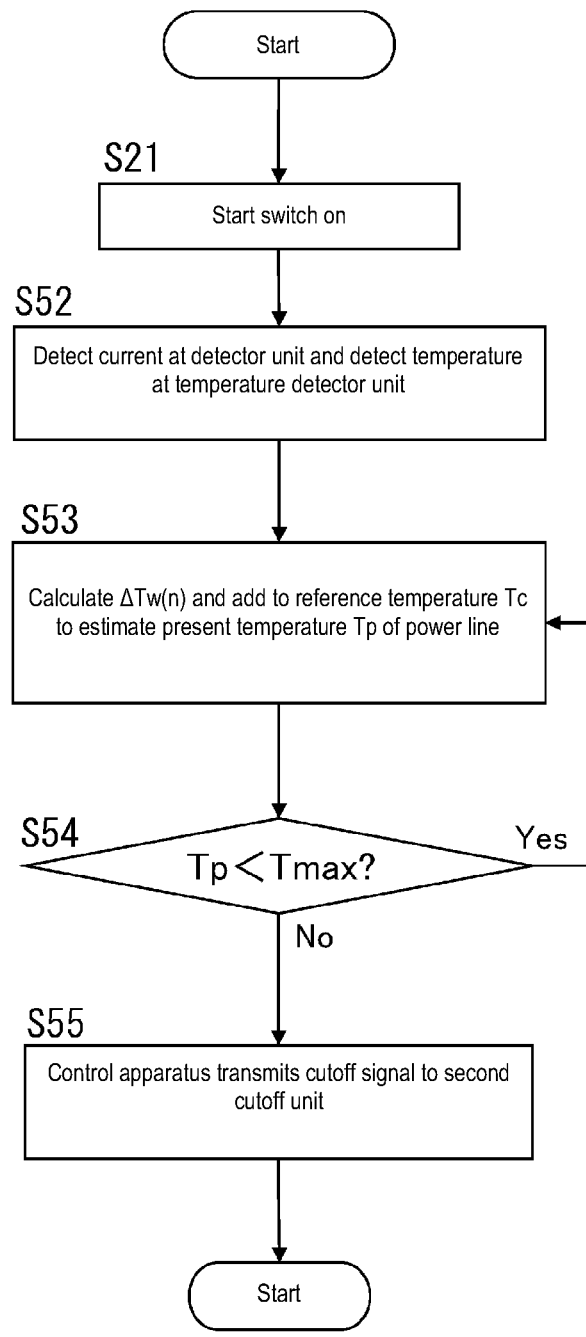
FIG. 9 is a flowchart depicting the flow of cutoff control based on temperature at a control apparatus of the cutoff control apparatus according to the second embodiment.

Next, one example of cutoff control by the control apparatus 120 based on temperature will be described with reference to FIG. 9 and the like. The flowchart depicted in FIG. 9 is processing that is repeatedly executed by the control apparatus 120 when a predetermined start condition is satisfied. The flowchart depicted in FIG. 9 is repeatedly executed by the control apparatus 120 in parallel with flowcharts depicted in FIGS. 6 to 8, for example.

First, in step S21 depicted in FIG. 9, a start switch (or "ignition switch") provided in the vehicle is switched from an off state to an on state. After this, the processing proceeds to step S52. After proceeding to step S52, the control apparatus 120 detects the current flowing through the power line 131 using the current value A from the detector unit 138. Together with this, the control apparatus 120 uses the temperature value Vt from the temperature detector unit 137 to detect the temperature in the vicinity of the power line 131 and/or the cutoff unit 134.

Next, after the processing has proceeded to step S53, the control apparatus 120 calculates the temperature rise ΔTw at the power line 131 based on Equation 1, adds the calculated temperature rise ΔTw to the reference temperature Tc, and estimates the present temperature Tp of the power line 131. As one example, the reference temperature Tc is the temperature value Vt that is inputted from the temperature detector unit 137 into the control apparatus 120 when step S52 is executed for the first time after the start switch (or "ignition switch") has been switched from off to on. At that time, the temperature change ΔTs per sampling interval (a predetermined time) Δt of the power line 131 is calculated, and the temperature rise ΔTw of the power line 131 is calculated using the temperature change ΔTs per sampling interval Δt. Here, the temperature change ΔTs per Δt is represented by Equation 2 below. Equation 2 is a modification of Equation 1.

$$\Delta Ts = \Delta Tw(n) - \Delta Tw(n-1) \qquad \text{(Equation 2)}$$

$$= \left(Rthw \times Rw(n-1) \times I(n-1)^2 - \Delta Tw(n-1) \times \right.$$

$$\left. (1 - \exp(-\Delta t/\tau w)\right)$$

Next, after proceeding to step S54, the control apparatus 120 compares the estimated present temperature Tp of the power line 131 with a predetermined upper limit temperature Tmax of the power line 131, and determines whether the temperature Tp of the power line 131 is smaller than the upper limit temperature Tmax. The upper limit temperature Tmax is stored in advance as a constant in a memory or the like of the control apparatus 120, for example. When the control apparatus 120 has determined that the temperature Tp of the power line 131 is lower than the upper limit temperature Tmax ("Yes" in step S54), the control apparatus 120 proceeds to step S53 and executes step S23 again. In more detail, the temperature change $\Delta$Ts in the next sampling interval $\Delta$t is calculated. The temperature change $\Delta$Ts per sampling interval $\Delta$t is then added to the previously calculated temperature rise $\Delta$Tw(n−1) of the power line 131, and the temperature rise $\Delta$Tw(n) of the power line 131 from the reference temperature Tc so far is newly calculated. The control apparatus 120 adds the calculated temperature rise $\Delta$Tw(n) to the reference temperature Tc to obtain the current temperature Tp of the power line 131. The control apparatus 120 repeatedly calculates the temperature rise $\Delta$Tw and estimates the temperature Tp of the power line 131 (step S53), and compares the temperature Tp of the power line 131 and the upper limit temperature Tmax (step S54) until the temperature Tp of the power line 131 becomes equal to or higher than the upper limit temperature Tmax. It is also possible to configure step S54 to compare the magnitudes of the temperature rise $\Delta$Tw and a predetermined threshold.

When the control apparatus 120 determines that the temperature Tp of the power line 131 is not lower than the upper limit temperature Tmax, that is, the temperature Tp of the power line 131 is equal to or higher than the upper limit temperature Tmax ("No" in step S54), the processing proceeds to step S55. After proceeding to step S55, the control apparatus 120 transmits the cutoff signal C1 to the second cutoff unit 134F to switch the second cutoff unit 134F to the cutoff state. The processing in FIG. 9 then ends. In this way, the current flowing through the power line 131 is cut off, which prevents any further rise in temperature for the power line 131. That is, the control apparatus 120 switches the second cutoff unit 134F to the cutoff state based on the temperature in the periphery of the second cutoff unit 134F. Note that in addition to the second cutoff unit 134F, the control apparatus 120 may also switch the first cutoff unit 134E and the relay 136 to the cutoff state.

Next, the effect of the above configuration will be described.

In the cutoff control apparatus 130 according to the present disclosure, the vehicle-mounted system 110 includes the detector unit 138 that detects the state of the current flowing through the power line 131. The control apparatus 120 controls cutting off by the first cutoff unit 134E based on the detection result of the detector unit 138 and the first cutoff characteristic Fc1 that sets the time before cutoff when a current of each current value A flows through the first cutoff unit 134E. The control apparatus 120 controls cutting off by the second cutoff unit 134F based on the detection result of the detector unit 138 and the second cutoff characteristic Fc2 that sets the time before cutoff when a current of each current value A flows through the second cutoff unit 134F. The first overcurrent state is a state where the current flowing through the power line 131 and the time for which this current flows through the power line 131 satisfy a cutoff condition based on the second cutoff characteristic Fc2. The second overcurrent state is a state where the current flowing through the power line 131 and the time for which this current flows through the power line 131 satisfy a cutoff condition based on the first cutoff characteristic Fc1. The time until a current of each current value A is cut off is shorter with the second cutoff characteristic Fc2 than with the first cutoff characteristic Fc1.

According to this configuration, the cutoff control apparatus 130 can control each of the first cutoff unit 134E and the second cutoff unit 134F according to individual cutoff characteristics. The cutoff control apparatus 130 can cut off the second cutoff unit 134F earlier than the first cutoff unit 134E, which is advantageous in a usage environment where it is desirable to cut off the second cutoff unit 134F earlier than the first cutoff unit 134E.

In the cutoff control apparatus 130 according to the present disclosure, the vehicle-mounted system 110 includes a relay 136 that switches between a cutoff state and a canceled state. The control apparatus 120 controls cutting off by the relay 136 based on the detection result of the detector unit 138 and the third cutoff characteristic Fc3 that sets a time until cutoff when the current of each current value A flows through the relay. The time taken until the current of the current value A is cut off is shorter with the first cutoff characteristic Fc1 and the second cutoff characteristic Fc2 than with the third cutoff characteristic Fc3. The cutoff control apparatus 130 according to this configuration is capable of preventing the relay 136 from breaking due to arcing that occurs within the relay 136 as it switches to the cutoff state. That is, the first cutoff unit 134E and the second cutoff unit 134F can be switched to the cutoff state to protect the relay 136.

In the cutoff control apparatus 130 according to the present disclosure, the control apparatus 120 switches the second cutoff unit 134F to the cutoff state based on the temperature in the vicinity of the second cutoff unit 134F. According to this configuration, the cutoff control apparatus 130 can perform control to switch the second cutoff unit 134F to the cutoff state with consideration to the temperature in the vicinity of the second cutoff unit 134F and more favorably protect the power line 131.

Other Embodiments

The present disclosure is not limited to the embodiments indicated in the above description and accompanying drawings, and as examples, the following embodiments are also included within the technical scope of the present disclosure.

The first embodiment discloses a configuration in which the second apparatus 20B outputs the first apparatus failure signal F2 to the periphery when the first apparatus failure signal F2 has been inputted from the first apparatus 20A. The present disclosure is not limited to this, and the second apparatus may switch the second cutoff unit to the cutoff state when the first apparatus failure signal has been inputted from the first apparatus. According to this configuration, the cutoff control apparatus switches the second cutoff unit to the cutoff state when control by the two control apparatuses, that is, the first apparatus and the second apparatus, is no longer operational. This means it is possible to limit the supplying of power from the power storage unit to the load when redundancy cannot be maintained for the control apparatus.

In the first embodiment, the first overcurrent state is a state where the current value A on the power line 31 is equal to or greater than the first threshold but less than the second threshold, which is greater than the first threshold. The first overcurrent state is not limited to this, and may be when the current value on the power line is equal to or greater than the first threshold. That is, the range of the first threshold may include the range of the second threshold or more.

In the first embodiment, the first apparatus 20A and the second apparatus 20B respectively compare the current value A with the first threshold and the second threshold to determine the state of the current flowing through the power line 31. The configuration is not limited to this, and the first apparatus and the second apparatus may be configured to cyclically repeat a process of detecting a differential value of the current value and compare an absolute value of this differential value with a threshold to determine the state of the current flowing through the power line. The first threshold and the second threshold may be fixed values, or the state of the current flowing through the power line may be determined while changing the thresholds according to the operating conditions of the load.

The first apparatus 20A and the second apparatus 20B are provided in the first embodiment. However, the configuration is not limited to this and the first apparatus and the second apparatus may be integrally provided as a single control apparatus.

A comparator may be used as the detector unit. In this case, when the current value on the power line indicates a value equal to or greater than a predetermined threshold, a predetermined high-level signal is outputted, and when the current value indicates a value that is below the predetermined threshold, a predetermined low-level signal is outputted. Alternatively, a configuration using a current transformer or the like may be used.

The first embodiment discloses that the first apparatus 20A outputs the first apparatus failure signal F2 indicating that the first apparatus 20A itself has malfunctioned to the second apparatus 20B when the monitoring unit 20C has detected malfunctioning. However, the configuration is not limited to this and it is also possible to use a configuration where a failure diagnosis instruction signal is outputted from the second apparatus to the first apparatus, and the first apparatus performs an operation that detects malfunctioning using the monitoring unit when the failure diagnosis instruction signal has been inputted.

Figure 10:
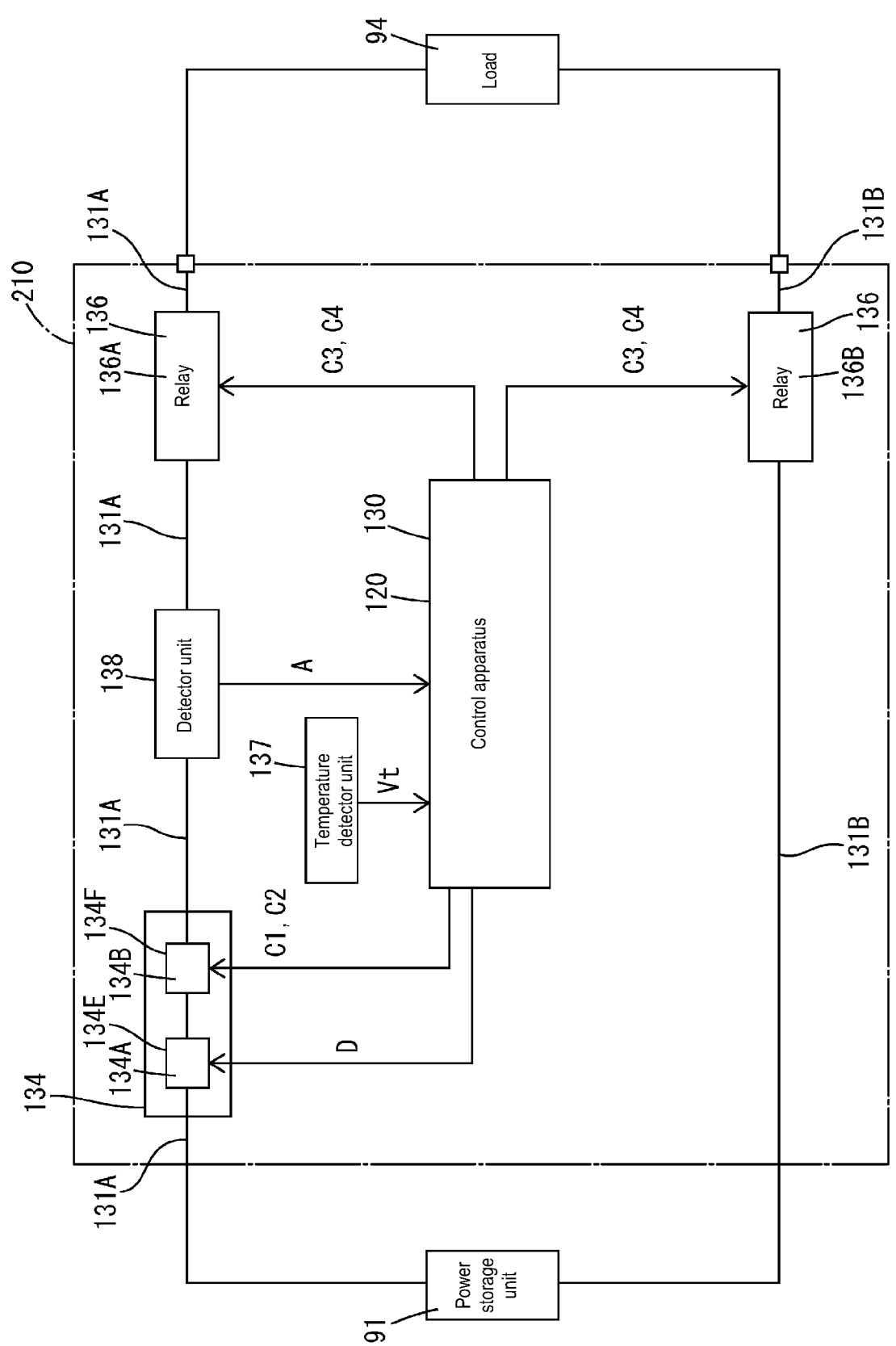
FIG. 10 is a block diagram depicting a vehicle-mounted system including a cutoff control apparatus according to another embodiment.

Unlike the second embodiment, as depicted in FIG. 10, the low potential-side power line 131B may be configured without the first low potential-side cutoff unit and the second low potential-side cutoff unit.

Unlike the second embodiment, a configuration provided with only one of the first cutoff unit and the second cutoff unit may be used.

All features of the embodiments disclosed here are exemplary and should not be regarded as limitations on the present disclosure. The scope of the present disclosure is indicated by the range of the patent claims, not the embodiments described above, and is intended to include all changes within the meaning and scope of the patent claims and their equivalents.

The invention claimed is:

1. A cutoff control apparatus configured to control a cutoff unit in a vehicle-mounted system, the vehicle-mounted system including: a power storage unit; a power line, which is a line through which power is transferred between the power storage unit and a load; and the cutoff unit that switches between a cutoff state that cuts off supplying of power from the power storage unit side to the load side on the power line and a canceled state where the cutoff state is canceled, wherein in the vehicle-mounted system, the cutoff unit includes a first cutoff unit and a second cutoff unit, and the second cutoff unit enters the cutoff state when a first overcurrent state has occurred on the power line when the first cutoff unit is in the canceled state, and the cutoff control apparatus comprises a control apparatus for instructing the first cutoff unit to switch to the cutoff state when the power line is in a second overcurrent state; and wherein the vehicle-mounted system includes a first detector unit that detects a state of a current flowing through the power line and a second detector unit that detects a state of a current flowing through the power line, and the control apparatus instructs the first cutoff unit to switch to the cutoff state when a detection result of either the first detector unit or the second detector unit indicates the second overcurrent state.

2. The cutoff control apparatus according to claim 1, wherein the control apparatus instructs the first cutoff unit to switch to the cutoff state when a collision detection sensor has detected a collision of a vehicle.

3. The cutoff control apparatus according to claim 1, wherein when the second detector unit has malfunctioned, the control apparatus notifies a periphery that the second detector unit has malfunctioned.

4. The cutoff control apparatus according to claim 1, wherein when the first detector unit has malfunctioned, the control apparatus instructs the first cutoff unit to switch to the cutoff state based on the detection result of the second detector unit.

5. The cutoff control apparatus according to claim 1, wherein a magnitude of a current flowing through the power line in the first overcurrent state is equal to or greater than a first threshold, a magnitude of a current flowing through the power line in the second overcurrent state is equal to or greater than a second threshold, and the first threshold is smaller than the second threshold.

6. The cutoff control apparatus according to claim 1, wherein the control apparatus includes a first apparatus and a second apparatus, the first apparatus switches the first cutoff unit to the cutoff state when a collision detection sensor has given notification of a collision of a vehicle or when the second overcurrent state has occurred, and the second apparatus switches the second cutoff unit to the cutoff state when the first overcurrent state has occurred.

7. The cutoff control apparatus according to claim 6, wherein when the first apparatus has malfunctioned, the second apparatus switches the second cutoff unit to cutoff state.

8. The cutoff control apparatus according to claim 7, wherein when the first apparatus has malfunctioned, the second apparatus notifies a periphery that the first apparatus has malfunctioned.

9. The cutoff control apparatus according to claim 1, wherein the vehicle-mounted system includes a detector unit configured to detect a state of a current flowing through a current path, the control apparatus controls cutting off by the first cutoff unit based on a detection result of the detector unit and a first cutoff characteristic that sets a time until cutoff, the time until cutoff being a period of time when a current of each current value flows through the first cutoff unit and controls cutting off by the second cutoff unit based on a detection result of the detector unit and a second cutoff characteristic that sets a time until cutoff when a current of each current value flows through the second cutoff unit, the first overcurrent state is a state where a cutoff condition based on the second cutoff characteristic is satisfied by the current flowing through the power line and a time for which the current flows through the power line, the second overcurrent state is a state where a cutoff condition based on the first cutoff characteristic is satisfied by the current flowing through the power line and a time for which the current flows through the power line, and the time until cutoff when a current of each current value flows is shorter for the second cutoff characteristic than for the first cutoff characteristic.

10. The cutoff control apparatus according to claim 9, wherein the vehicle-mounted system includes a relay that switches between the cutoff state and the canceled state, the control apparatus controls cutting off by the relay based on a detection result of the detector unit and a third cutoff characteristic that sets a time until cutoff when a current of each current value flows through the relay, and the time until cutoff when a current of each current value flows is shorter for the first cutoff characteristic and the second cutoff characteristic than for the third cutoff characteristic.

11. A cutoff control apparatus configured to control a cutoff unit in a vehicle-mounted system, the vehicle-mounted system including: a power storage unit; a power line, which is a line through which power is transferred between the power storage unit and a load; and the cutoff unit that switches between a cutoff state that cuts off supplying of power from the power storage unit side to the load side on the power line and a canceled state where the cutoff state is canceled, wherein in the vehicle-mounted system, the cutoff unit includes a first cutoff unit and a second cutoff unit, and the second cutoff unit enters the cutoff state when a first overcurrent state has occurred on the power line when the first cutoff unit is in the canceled state, and the cutoff control apparatus comprises a control apparatus for instructing the first cutoff unit to switch to the cutoff state when the power line is in a second overcurrent state, and wherein a magnitude of a current flowing through the power line in the first overcurrent state is equal to or greater than a first threshold, a magnitude of a current flowing through the power line in the second overcurrent state is equal to or greater than a second threshold, and the first threshold is smaller than the second threshold.

12. A cutoff control apparatus configured to control a cutoff unit in a vehicle-mounted system, the vehicle-mounted system including: a power storage unit; a power line, which is a line through which power is transferred between the power storage unit and a load; and the cutoff unit that switches between a cutoff state that cuts off supplying of power from the power storage unit side to the load side on the power line and a canceled state where the cutoff state is canceled, wherein in the vehicle-mounted system, the cutoff unit includes a first cutoff unit and a second cutoff unit, and the second cutoff unit enters the cutoff state when a first overcurrent state has occurred on the power line when the first cutoff unit is in the canceled state, and the cutoff control apparatus comprises a control apparatus for instructing the first cutoff unit to switch to the cutoff state when the power line is in a second overcurrent state, and wherein the control apparatus includes a first apparatus and a second apparatus, the first apparatus switches the first cutoff unit to the cutoff state when a collision detection sensor has given notification of a collision of a vehicle or when the second overcurrent state has occurred, and the second apparatus switches the second cutoff unit to the cutoff state when the first overcurrent state has occurred.

* * * * *